United States Patent
Yoffe et al.

(10) Patent No.: US 11,790,676 B2
(45) Date of Patent: Oct. 17, 2023

(54) ARTIFICIAL INTELLIGENCE ASSISTED WARRANTY VERIFICATION

(71) Applicant: TECHSEE AUGMENTED VISION LTD., Herzliya (IL)

(72) Inventors: Amir Yoffe, Tel-Mond (IL); Eitan Cohen, Tel Aviv (IL)

(73) Assignee: TechSee Augmented Vision, Ltd., Herzliya (IL)

( * ) Notice: Subject to any disclaimer, the term of this patent is extended or adjusted under 35 U.S.C. 154(b) by 0 days.

(21) Appl. No.: 17/566,499

(22) Filed: Dec. 30, 2021

(65) Prior Publication Data

US 2022/0207898 A1  Jun. 30, 2022

Related U.S. Application Data

(60) Provisional application No. 63/131,875, filed on Dec. 30, 2020.

(51) Int. Cl.
*G06V 30/242* (2022.01)
*G06T 7/00* (2017.01)
(Continued)

(52) U.S. Cl.
CPC .......... *G06V 30/153* (2022.01); *G06F 40/30* (2020.01); *G06Q 30/012* (2013.01);
(Continued)

(58) Field of Classification Search
CPC .... G06V 30/153; G06V 10/12; G06V 30/147; G06V 30/242; G06V 10/26; G06V 10/44;
(Continued)

(56) References Cited

U.S. PATENT DOCUMENTS 9,864,949 B1  1/2018  Astigarraga et al.
10,410,428 B1  9/2019  Reeder et al.
(Continued)

OTHER PUBLICATIONS

International Search Report dated May 11, 2022, in corresponding International Application No. PCT/IB2021/062505.
(Continued)

*Primary Examiner* — Amandeep Saini
*Assistant Examiner* — Daniella M. DiGuglielmo
(74) *Attorney, Agent, or Firm* — FINNEGAN, HENDERSON, FARABOW, GARRETT & DUNNER LLP

(57) ABSTRACT

A system for performing remote artificial intelligence-assisted electronic warranty verification including at least one processor configured to transmit an instruction to capture at least one product image of a specific product, receive and perform product image analysis on the product image to identify at least one product-distinguishing characteristic, transmit an instruction to capture an image of a purchase receipt, receive and perform receipt image analysis on the purchase receipt image to identify product purchase information, access a universal data structure containing data on products offered by suppliers, use the at least one product-distinguishing characteristic and product purchase information to identify in the universal data structure the specific product, identify in the universal data structure a link to a warranty data structure of the supplier, access the link to lookup the specific product and receive a warranty coverage indication from the supplier data structure, and transmit an indication of warranty coverage.

20 Claims, 22 Drawing Sheets

(51) Int. Cl.
*G06Q 30/012* (2023.01)
*G06F 40/30* (2020.01)
*G06V 10/12* (2022.01)
*G10L 13/02* (2013.01)
*G10L 15/18* (2013.01)
*G10L 15/22* (2006.01)
*G06V 30/10* (2022.01)
*G06V 10/26* (2022.01)
*G06V 20/20* (2022.01)
*G06V 10/80* (2022.01)
*G06V 10/44* (2022.01)
*G06V 30/148* (2022.01)
*G06V 30/146* (2022.01)
*G06F 40/35* (2020.01)
*G10L 15/26* (2006.01)

(52) U.S. Cl.
CPC ............ *G06T 7/0006* (2013.01); *G06V 10/12* (2022.01); *G06V 30/10* (2022.01); *G06V 30/147* (2022.01); *G06V 30/242* (2022.01); *G10L 13/02* (2013.01); *G10L 15/1815* (2013.01); *G10L 15/22* (2013.01); *G06F 40/35* (2020.01); *G06T 2207/30176* (2013.01); *G06V 10/26* (2022.01); *G06V 10/44* (2022.01); *G06V 10/803* (2022.01); *G06V 20/20* (2022.01); *G10L 15/26* (2013.01); *G10L 2015/223* (2013.01)

(58) Field of Classification Search
CPC ...... G06V 10/803; G06V 20/20; G06V 30/10; G06F 40/30; G06F 40/35; G06Q 30/012; G06T 7/0006; G06T 2207/30176; G10L 13/02; G10L 15/1815; G10L 15/22; G10L 2015/223; G10L 15/26
See application file for complete search history.

(56) References Cited

U.S. PATENT DOCUMENTS

| | | |
|---|---|---|
| 2009/0287534 A1 | 11/2009 | Guo et al. |
| 2014/0136423 A1* | 5/2014 | Moreton .............. G06Q 30/012 705/302 |
| 2014/0188641 A1* | 7/2014 | Argue .................. G06Q 30/012 705/16 |
| 2020/0126445 A1 | 4/2020 | Tan et al. |
| 2020/0250631 A1* | 8/2020 | Edwards ................ G06F 40/30 |
| 2020/0404100 A1 | 12/2020 | Amir et al. |

OTHER PUBLICATIONS

International Preliminary Report on Patentability dated Jul. 4, 2023, in corresponding International Application No. PCT/IB2021/062505.

* cited by examiner

ARTIFICIAL INTELLIGENCE ASSISTED WARRANTY VERIFICATION

CROSS-REFERENCE TO RELATED APPLICATION

This application claims the benefit of U.S. Provisional Patent Application No. 63/131,875, filed Dec. 30, 2020, which is incorporated by reference herein in its entirety.

TECHNOLOGICAL FIELD

Embodiments of the present disclosure relate generally to the field of electronic warranty verification. More particularly, embodiments of the present disclosure relate to systems, methods, and non-transitory computer readable medium capable of performing remote artificial intelligence-assisted electronic warranty verification to assist an entity with warranty verification of a product.

BACKGROUND

Warranty verification systems utilized nowadays make it difficult for product suppliers, such as manufacturers or sellers, of a given product to provide efficient, in terms of time, accessibility, and accuracy, warranty verification to entities, such as customers or end-users, with respect to a given product. Despite a recent push toward self-service schemes, customers have been slow to adopt self-service technologies. Today's warranty verification models and relevant technologies are subject to numerous challenges including warranty coverage identification challenges, limited warranty eligibility verification accuracy, warranty processing fees, labor costs, service call charges, communication gaps, increasingly complex extended supply chains, and customer dissatisfaction and frustration.

The techniques disclosed in this disclosure aim to provide remote efficient warranty verification services, reduce the frequency of incorrect warranty coverage indications, and limit the incidence of communication with customer support assistants. These techniques are useful for increasing warranty identification outcomes and eligibility verification accuracy, shortening consumer wait time, and improving customer satisfaction and independence.

SUMMARY

Embodiments consistent with the present disclosure may provide systems, methods, and non-transitory computer readable medium for performing remote artificial intelligence-assisted electronic warranty verification. The systems, methods, and non-transitory computer readable medium disclosed herein may be capable of performing remote artificial intelligence-assisted electronic warranty verification operations which may enable entities, such as a customer or end-user of a product, to automatically and remotely validate warranty coverage with respect to a specific product in interest. For example, the automatic self-service warranty verification operations may include an automatic application and/or process that may be used by remote entities to validate their warranty when a problem is encountered in a product that was recently purchased. The disclosed systems and methods may be implemented using a combination of conventional hardware and/or software as well as specialized hardware and/or software, such as a machine constructed and/or programed specifically for performing functions associated with the disclosed embodiments. Consistent with other disclosed embodiments, non-transitory computer readable media may store program instructions, which may be executed by at least one processing device and may perform any of the steps and/or methods described herein.

According to one aspect of the present disclosure, the disclosed embodiments may relate to systems, methods, and non-transitory computer readable medium for performing remote artificial intelligence-assisted electronic warranty verification operations. By way of example only, the operations may include transmitting an instruction to an entity to capture at least one product image of a specific product; receiving the at least one product image; performing product image analysis on the at least one product image to identify at least one product-distinguishing characteristic; transmitting an instruction to the entity to capture an image of a purchase receipt for the specific product; receiving the purchase receipt image; performing receipt image analysis on the received purchase receipt image to identify product purchase information including a purchased product identity and a purchase date; accessing a universal data structure containing data on products offered by a plurality of suppliers; using the at least one product-distinguishing characteristic obtained from the image analysis on the product image and the product purchase information obtained from the image analysis on the purchase receipt to identify in the universal data structure the specific product; identifying in the universal data structure a supplier of the specific product; identifying in the universal data structure a link to a warranty data structure of the supplier; accessing the link to perform a remote lookup of the specific product in the warranty data structure of the supplier; receiving a warranty coverage indication from the warranty data structure of the supplier; and transmitting to the entity an indication of warranty coverage.

The foregoing general description provides only a few examples of the disclosed embodiments and is not intended to summarize all aspects of the disclosed embodiments. Moreover, the following detailed description is exemplary and explanatory only and is not restrictive of the claims.

BRIEF DESCRIPTION OF THE DRAWINGS

In order to better understand various aspects of the present disclosure and to see how they may be carried out in practice, certain embodiments will now be described, by way of non-limiting examples only, with reference to the accompanying drawings. Features shown in the drawings, which are incorporated in and constitute a part of this disclosure, are meant to be illustrative of only some embodiments of aspects of the invention, unless otherwise implicitly indicated. In the drawings, like reference numerals are used to indicate corresponding parts.

DETAILED DESCRIPTION

Figure 1:
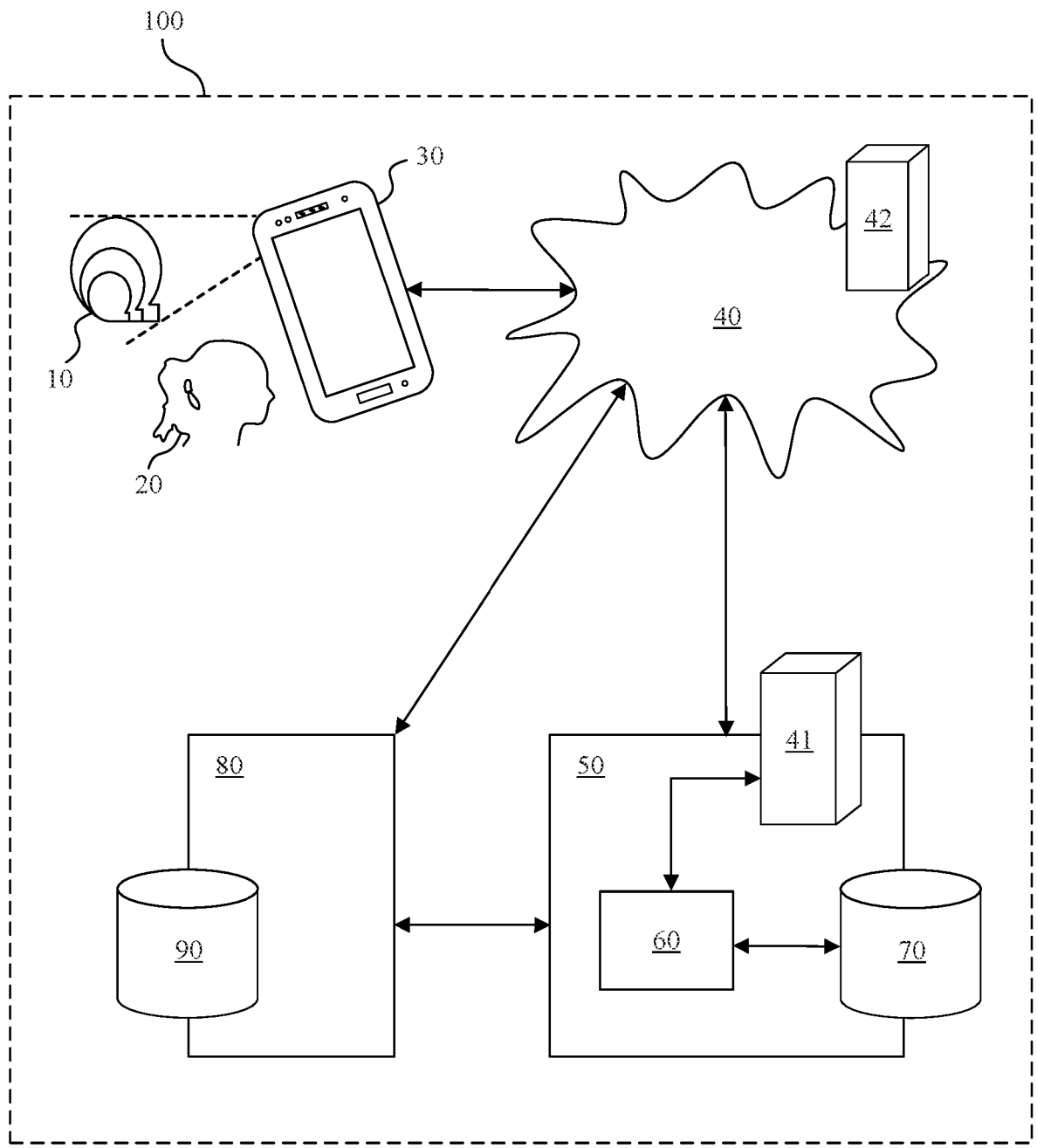
FIG. 1 is a simplified network diagram illustrating exemplary communications between an entity seeking warranty verification, a warranty service center, and a product supplier via at least one network during a remote artificial intelligence-assisted electronic warranty verification session, consistent with at least one embodiment of the present disclosure.

The following detailed description provides various non-limiting embodiments, or examples, for implementing different features of the provided subject matter and refers to the accompanying drawings, which are to be considered in all aspects as illustrative only and not restrictive in any manner. Wherever possible, the same reference numerals are used in the drawings and the following description to refer to the same or similar parts. This repetition is for the purpose of simplicity and clarity and does not in itself dictate a relationship between the various embodiments discussed. While several illustrative embodiments are described herein, modifications, adaptations and other implementations are possible. For example, substitutions, additions, and/or modifications may be made to the components illustrated in the drawings, and the illustrative methods described herein may be modified by substituting, reordering, removing, and/or adding steps to the disclosed methods. Moreover, in certain instances, well-known or conventional details may not be described in order to provide a more concise discussion of the embodiments. Accordingly, the following detailed description is not limited to the disclosed embodiments and examples. Instead, the proper scope is to be defined by the claims.

Various aspects of the present disclosure may be described with reference to a system, method, device, and/or computer readable medium capable of performing remote artificial intelligence-assisted electronic warranty verification operations. It is intended that the disclosure of one is a disclosure of all. For example, it is to be understood that the disclosure of a computer readable medium, as described herein, may also constitute a disclosure of methods implemented by a computer readable medium, as well as systems and/or devices for implementing those methods, for example, via at least one processor. Moreover, features of the presently disclosed subject matter are, for brevity, described in the context of particular embodiments. However, it is to be understood that this form of disclosure is for ease of discussion only, and one or more aspects of one embodiment disclosed herein may also be combined with one or more aspects of other embodiments disclosed herein, within the intended scope of this disclosure. Likewise, features and/or steps described in the context of a specific combination may be considered as separate embodiments, either alone or in a context other than the specific combination disclosed.

Aspects of the present disclosure may relate to techniques for performing remote artificial intelligence-assisted electronic warranty verification operations. More specifically, aspects of the present disclosure may relate to methods, systems, and/or non-transitory computer readable medium capable of performing remote artificial intelligence-assisted electronic warranty verification operations. The term "warranty," as used herein, should be expansively construed to cover any type of guarantee that a supplier, manufacturer, or similar party may make regarding the condition of a product to an entity, such as an end-user or customer of the product. A warranty may relate to an express warranty which guarantees that a product will meet certain conditions of quality and performance, an implied warranty which guarantees that the product will function as designed, an extended warranty which is a service contract that relates to product repair and/or maintenance beyond or in addition to a manufacturer's warranty, or any other type of guarantee that a product will meet certain specifications. If the product does not meet certain specifications, for example if the product is defective, the end-user or purchaser of the product may seek to have the supplier, manufacturer, or similar party repair, replace, or otherwise correct the problem. Warranty coverage for a product may be included at the time of purchase or contingent upon registration of the product. Certain warranty coverage exceptions may apply, and not every product defect may be covered under a warranty. Additionally, the terms and conditions of the warranty may depend on the type of warranty covering the product.

In the disclosed embodiments, the term "electronic warranty verification" may relate to any technique and/or operation in which the truth, accuracy, scope, eligibility, and/or validity of a product warranty may be verified, validated, confirmed, or otherwise analyzed, in view of information provided by an individual, such as a consumer or the end-user of a product. Electronic warranty verification may be sought by the end-user of a product from a remote location such as the end-user's home, office, or any other remote site via any mobile communications device including a personal computer, a wearable computer, a tablet, a smartphone, or any other electronic computing device having data processing capabilities. Electronic warranty verification may be provided by a warranty service center and may utilize a remote customer service agent, artificial intelligence, for example an automated customer service assistant, and/or a combination thereof. It is to be understood that a warranty service center, as used herein, is not limited to a single warranty service center, and may encompass multiple warranty service centers, individuals or groups of individuals in different geographic locations. Optionally, the term warranty service center may also encompass a fully virtual service system in which warranty verification operations may be performed in an automated fashion.

As used herein, the term "remote artificial intelligence-assisted electronic warranty verification" may relate to any electronic warranty verification service system and/or operations utilizing artificial intelligence techniques to establish a self-service mechanism in which warranty information may be automatically analyzed by a warranty service center to determine an indication of warranty coverage which may be provided to an entity, such as an end-user, in an automated fashion without (or with reduced) human intervention. For example, remote artificial intelligence-assisted electronic warranty verification operations may relate to any self-service session in which the end-user may obtain an indication of warranty coverage with respect to any product of interest including consumer goods (such as electronic products, software which may be utilizable therewith, furniture, or appliances), industrial goods, or any other article or substance that is manufactured, designed, or refined for sale, which may be covered under a warranty.

The term "artificial intelligence" may refer, for example, to the simulation of human intelligence in machines or processors that exhibit traits associated with a human mind such as learning and problem-solving. Artificial intelligence, machine learning, deep learning, or neural network processing techniques may enable the automatic learning through absorption of huge amounts of unstructured data such as text, audio, images, or videos and user preferences analyzed over a period of time such as through statistical computation and analysis. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and/or any other algorithm in which a machine or processor takes inputs and outputs simultaneously in order to "learn" the data and produce outputs when given new inputs. As used herein, artificial intelligence may relate to machine learning algorithms, also referred to as machine learning models, which may be trained using training examples, for example in the cases described below involving image recognition and processing.

A trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

While artificial intelligence may be utilized during certain remote artificial intelligence-assisted electronic warranty verification operations during an electronic warranty verification session, it is to be understood that certain operations may be executed with or without the use of artificial intelligence. Moreover, the techniques and/or operations disclosed herein may be implemented as automatic applications and/or processes, which may employ certain artificial intelligence analysis techniques and/or operations disclosed herein, that may be used by end-users to verify their warranty. For example, a remote artificial intelligence-assisted electronic warranty verification session may include an interactive application on a mobile communications device enabling an entity, such as an end-user of a product seeking warranty coverage information, to obtain certain terms and situations in which repairs or exchanges may be warranted if a recently purchased product does not function as originally described or intended.

Turning to the figures, FIG. 1 depicts a simplified network diagram illustrating exemplary communications during a remote artificial intelligence-assisted electronic warranty verification session 100. More specifically, the simplified network diagram illustrates exemplary network communications between an entity 20 (e.g., end-user) seeking warranty verification with respect to a specific product 10 via a mobile communications device 30 (e.g., cell phone), a warranty service center (WSC) 50 capable of automatically providing electronic warranty verification with respect to the product 10 using artificial intelligence, and a supplier 80 of the product 10 during a remote artificial intelligence-assisted electronic warranty verification session 100. Network communications between the entity 20, the WSC 50, and the supplier 80 during the remote artificial intelligence-assisted electronic warranty verification session 100 may be facilitated by at least one server configured to collect and/or send information across the at least one network 40. The at least one server may be implemented as part of the WSC 50, such as remote server 41, and/or in the at least one network 40 in a server farm or in a cloud computing infrastructure, such as remote server 42.

The WSC 50 may include a control system 60 that is operably connected to a universal data structure 70 and at least one server and may be configured and operable to perform remote artificial intelligence-assisted electronic warranty verification operations with respect to a number of different products, for example product 10, in view of information obtained from the entity 20 seeking warranty verification and in view of warranty information obtained from a warranty data structure 90 of the supplier 80. For example, the WSC 50 may be configured to send and/or receive information pertaining to the specific product 10 for which warranty verification is sought to and/or from the mobile communications device 30, via at least one network 40. Additionally, the WSC 50 may be configured to send and/or receive information pertaining to the product 10 for which warranty verification is sought to and/or from the supplier 80, via at least one network 40. With the information obtained from the entity 20 and the supplier 80, the WSC 50 may be configured to determine and provide an indication of warranty coverage in an automated fashion without human intervention.

According to one embodiment, a system comprising at least one processor may be configured to perform the remote artificial intelligence-assisted electronic warranty verification operations disclosed herein. The term "processor," as used herein may refer to any physical device or group of devices having electric circuitry that performs a logic operation on input or inputs. For example, the at least one processor may include one or more integrated circuits (IC), including an application-specific integrated circuit (ASIC), microchips, microcontrollers, microprocessors, all or part of a central processing unit (CPU), a graphics processing unit (GPU), a digital signal processor (DSP), a field-programmable gate array (FPGA), a central processing unit (CPA), a visual processing unit (VPU), an image signal processor (ISR), server, virtual server, or any other circuits suitable for executing instructions or performing logic operations. The instructions executed by at least one processor may, for example, be pre-loaded into a memory integrated with or embedded into a controller or may be stored in a separate memory. Moreover, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by any other means that permit them to interact.

Figure 2:
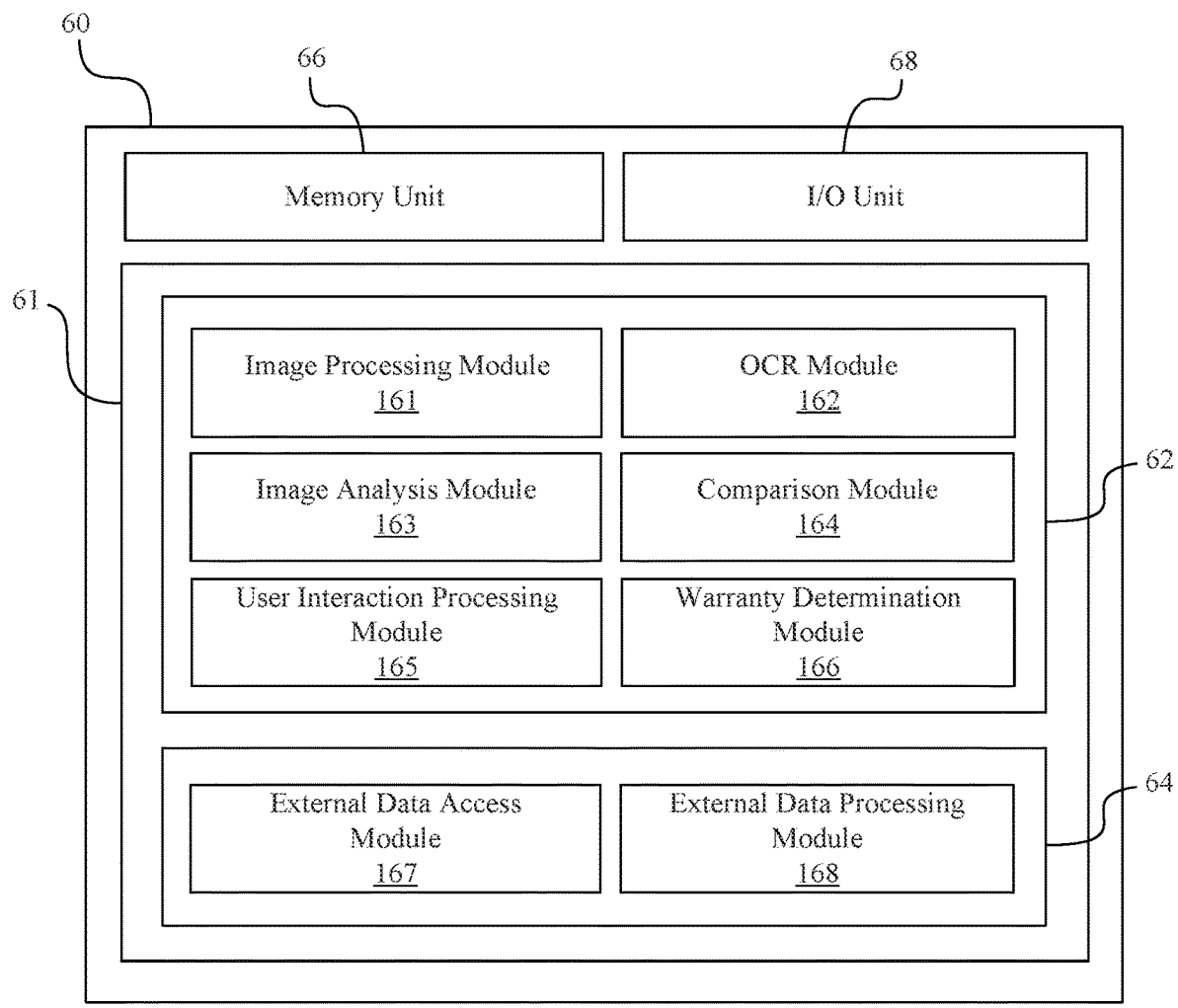
FIG. 2 is a block diagram illustrating exemplary components of a control system of the warranty service center illustrated in FIG. 1, consistent with at least one embodiment of the present disclosure.

FIG. 2 is a block diagram illustrating exemplary components of the control system 60 of the WSC 50 illustrated in FIG. 1. The control system 60 may include at least one processor, such as a neural network processor, and may be configured to perform remote artificial intelligence-assisted electronic warranty verification operations, in accordance with at least one embodiment of the present disclosure. The control system 60 may include a control unit 61, a memory unit 66, and an input/output unit (I/O unit) 68. The control unit 61 may be configured and operable to process and analyze data, such as image data and/or text data, received from the various components of the system illustrated in FIG. 1 including the mobile communications device 30, the universal data structure 70, and/or the supplier 80. The memory unit 66 may be configured as a non-transitory computer readable medium and/or any form of computer readable media capable of storing computer instructions and/or application programs and/or data capable of controlling the control system 60, and various components thereof, and may also store one or more databases. The I/O unit 68 may be configured and operable to send and/or receive data over at least one network and/or to at least one server.

In at least one embodiment, the control unit 61 may include a first processing unit 62 and a second processing unit 64. The first processing unit 62 may include an image processing module 161 configured and operable to process and analyze image data received from a mobile communications device, an OCR module 162 configured and operable to identify characters within image data, an image analysis module 163 configured and operable to analyze data accessible to the control system 60 using artificial intelligence, a comparison module 164 configured and operable to compare data from at least one database and/or data structure containing stored reference data against newly acquired image data, a user interaction processing module 165 configured and operable to communicate with the user of a mobile communications device via an interactive application, and a warranty determination module 166 configured to determine an indication of warranty coverage. The second processing unit 64 may include an external data access module 167 configured and operable to access data maintained by the supplier, for example data stored in the warranty data structure 90 of the supplier 80 illustrated in FIG. 1, and an external data processing module 168 configured and operable to process and analyze data accessed by the external data access module 167.

According to another embodiment of the present disclosure, a non-transitory computer readable medium may include instructions for performing certain operations, for example the remote artificial intelligence-assisted electronic warranty verification operations disclosed herein. As used herein, the term "non-transitory computer readable medium" should be expansively construed to cover any medium capable of storing data in any memory in a way that may be read by any computing device having at least one processor to carry out operations, methods, or any other instructions stored in the memory. Moreover, the term "computer readable medium" may refer to multiple structures, such as a plurality of computer readable mediums and/or memory devices. A memory device may include a Random-Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory device may include one or more separate storage devices collocated or disbursed, capable of storing data structures, instructions, or any other data. The memory device may further include a memory portion containing instructions for the processor to execute. The memory device may also be used as a working scratch pad for the processors or as a temporary storage. Instructions contained on the non-transitory computer readable medium, when executed by at least one processor, may cause the at least one processor to carry out a method for performing one or more features or methods of the disclosed embodiments.

In some embodiments, the non-transitory computer readable medium may, for example, be implemented as hardware, firmware, software, or any combination thereof. The software may preferably be implemented as an application program tangibly embodied on a program storage unit or computer readable medium consisting of parts, or of certain devices and/or a combination of devices. The application program may be uploaded to, and executed by, a machine including any suitable architecture. For example, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. A non-transitory computer readable medium may be any computer readable medium except for a transitory propagating signal.

Referring back to FIGS. 1-2, operations of the remote artificial intelligence-assisted electronic warranty verification session 100 may relate to instructions included on at least one non-transitory computer readable medium. The instructions may be readable by at least one processor of the WSC 50 such that some or all of the remote artificial intelligence-assisted electronic warranty verification operations disclosed herein may be performed by at least one processor of the WSC 50. In one non-limiting embodiment, the instructions included on a non-transitory computer readable medium may be executed by the control unit 61 such that at least one processor of the control unit 61 performs certain operations of the remote artificial intelligence-assisted electronic warranty verification session 100. It is to be understood, as noted above, that the non-transitory computer readable medium is not limited to such an implementation.

Some disclosed embodiments may involve transmitting an instruction to an entity to capture at least one product image of a specific product. As described herein, an instruction to an entity to capture at least one product image of a specific product may relate to any command, request, and/or direction prompting the entity, such as an end-user or owner of a specific product for which warranty verification is sought, to capture, or otherwise obtain, an image of a product. The product image may relate to a single image, a burst of images, a screenshot, and/or a video and may include an image of the entire product for which warranty verification is sought, an image of a portion of the product, an image of the manufacturer's sticker on the product, and/or an image of any other identifying characteristics associated with the specific product for which warranty verification is sought. As described herein, a specific product may relate to any product including consumer goods (such as electronic products, software which may be utilizable therewith, furniture, or appliances), industrial goods, or any other article or substance that is manufactured, designed, or refined for sale, which may be covered under a warranty.

In some embodiments, the instruction to capture at least one product image of a specific product may be transmitted to the mobile communications device of an entity seeking warranty verification with respect to the specific product. As defined herein, the term "transmitted" may relate to the passing of data from one location, such as a warranty service center, to another location, such as an entity's mobile communication device. The transmission of data may occur over at least one network in real time or may be transmitted to the mobile communication device prior to the initiation of a warranty verification session. For example, instructions, such as an instruction to capture an image may be downloaded to, or otherwise included in an interactive application on, the mobile communication device of an entity seeking warranty verification such that instructions are still received by a user in the event of temporary connectivity over at least one network (e.g., to the cloud).

As used herein, the term at least one network may refer to a single network or multiple networks. The network may include a plurality of networks having the same or different protocol stacks which may coexist on the same physical infrastructure. The network may constitute any type of physical or wireless computer networking arrangement used to exchange data. For example, a network may be the Internet, a private data network, a virtual private network using a public network, a Wi-Fi network, a LAN or WAN network, and/or any other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between the mobile communications device and the TSC. Signals are received over a network when they are obtained following transmission via the network.

As disclosed herein, a mobile communications device may refer to any device capable of exchanging data using any communications network. In some examples, the mobile communications device may include a smartphone, a tablet, a smart watch, mobile station, user equipment (UE), personal digital assistant (PDA), laptop, wearable sensor, e-Readers, dedicated terminals, smart glasses, virtual reality headset, IoT device, and any other device, or combination of devices, that may enable user communication with a remote server. Such mobile communications devices may include a display such as an LED display, augmented reality (AR), virtual reality (VR) display, and any other display capable of depicting image data including image data corresponding to an interactive application for verifying a products warranty. The mobile communications device may also include an image sensor or any other device capable of detecting and converting optical input signals into electrical signals. The image sensor may be part of a camera included in, or connectable to, the entities mobile communications device.

Figure 3:
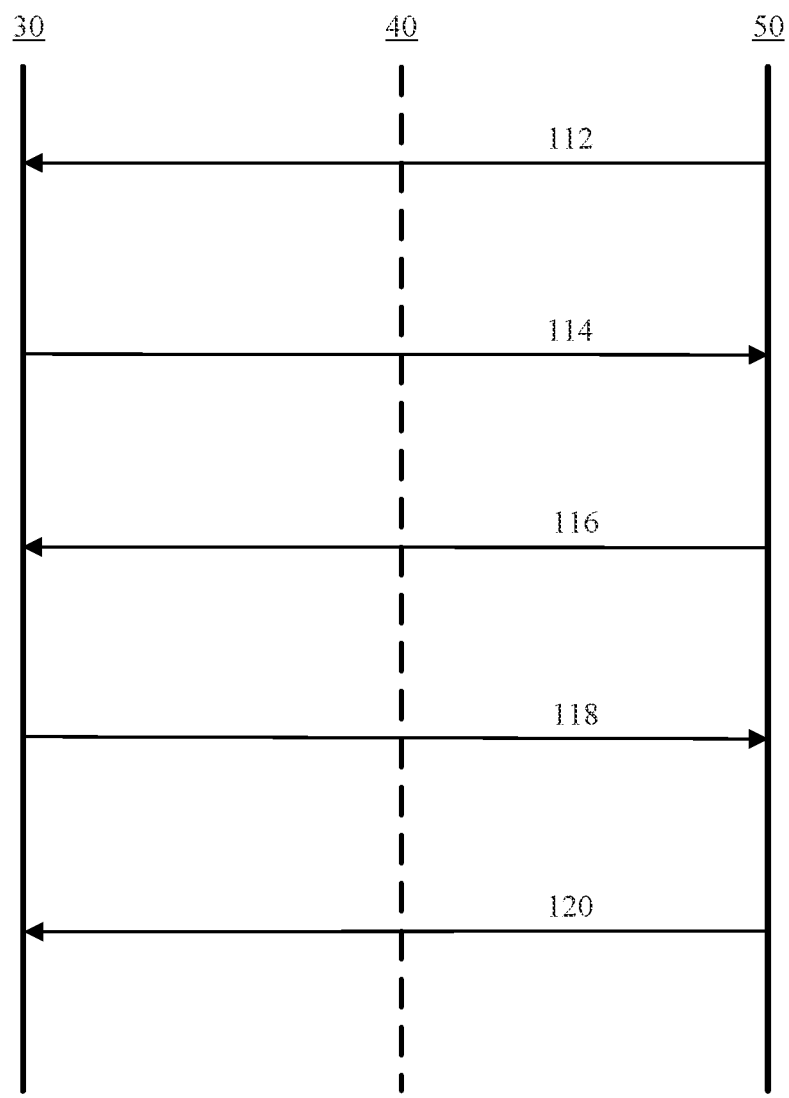
FIG. 3 is a sequence diagram illustrating exemplary network communications between an entity's mobile communications device and the warranty service center via at least one network during a remote artificial intelligence-assisted electronic warranty verification session, consistent with at least one embodiment of the present disclosure.
Figure 4:
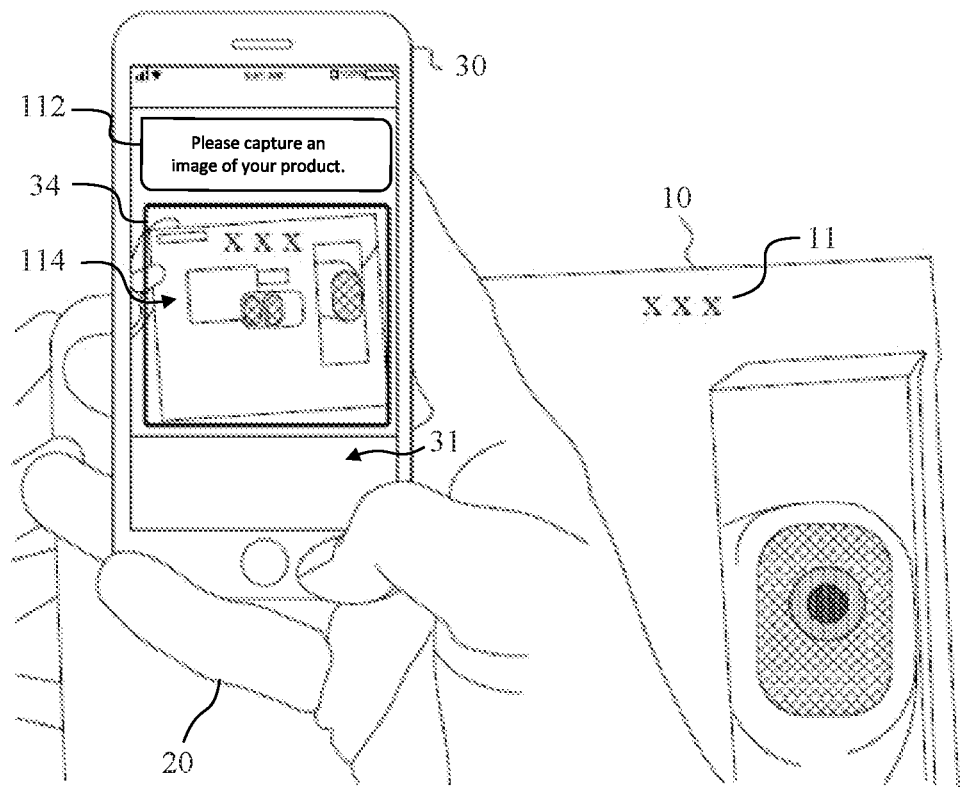
FIG. 4 illustrates certain aspects of a remote artificial intelligence-assisted electronic warranty verification session from the perspective of the entity seeking warranty verification, consistent with at least one embodiment of the present disclosure.
Figure 5A:
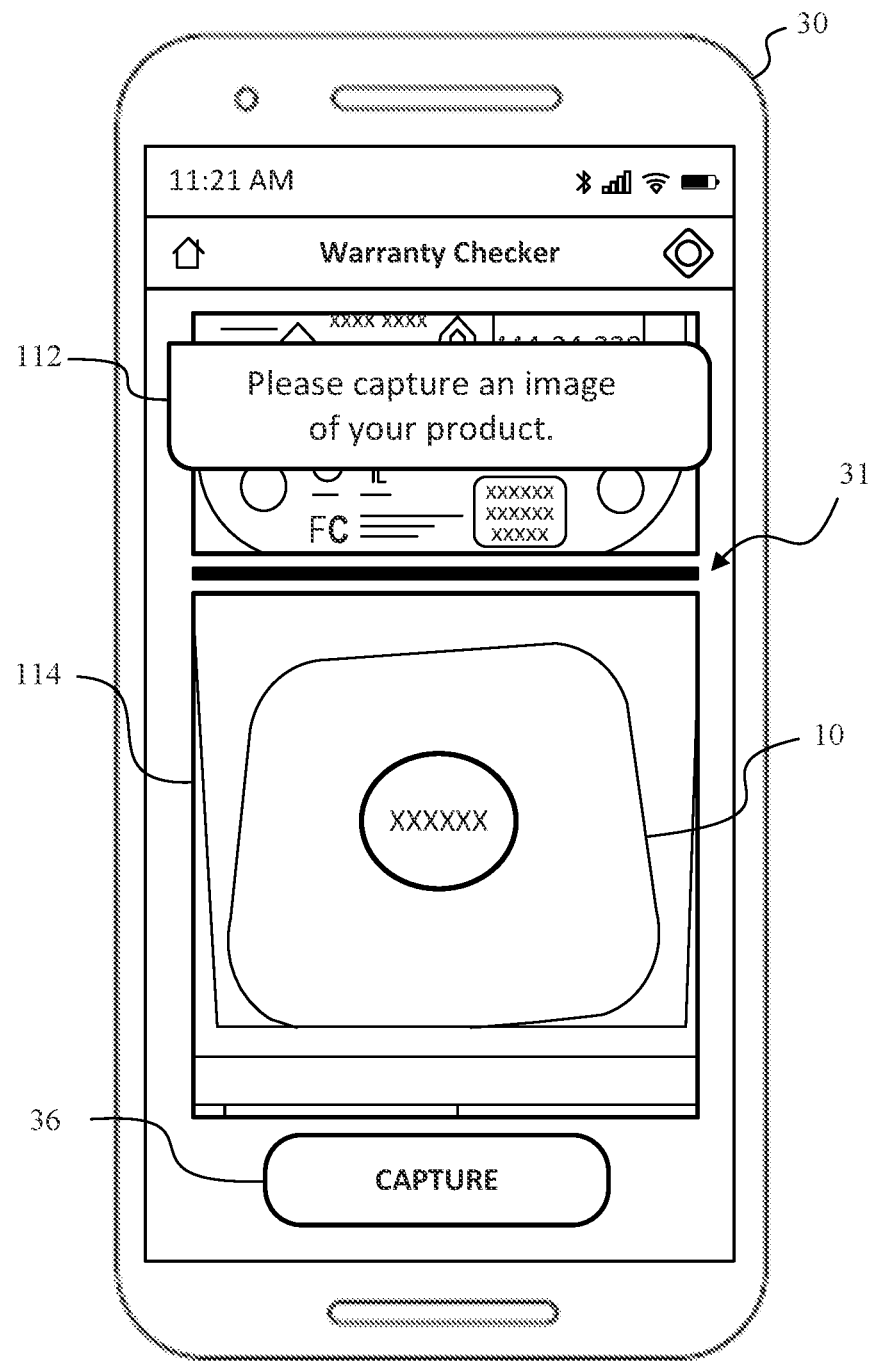
FIGS. 5A-5B illustrate exemplary interactive applications relating to the remote artificial intelligence-assisted electronic warranty verification session displayed on an entity's mobile communications device, as illustrated in FIG. 4.
Figure 5B:
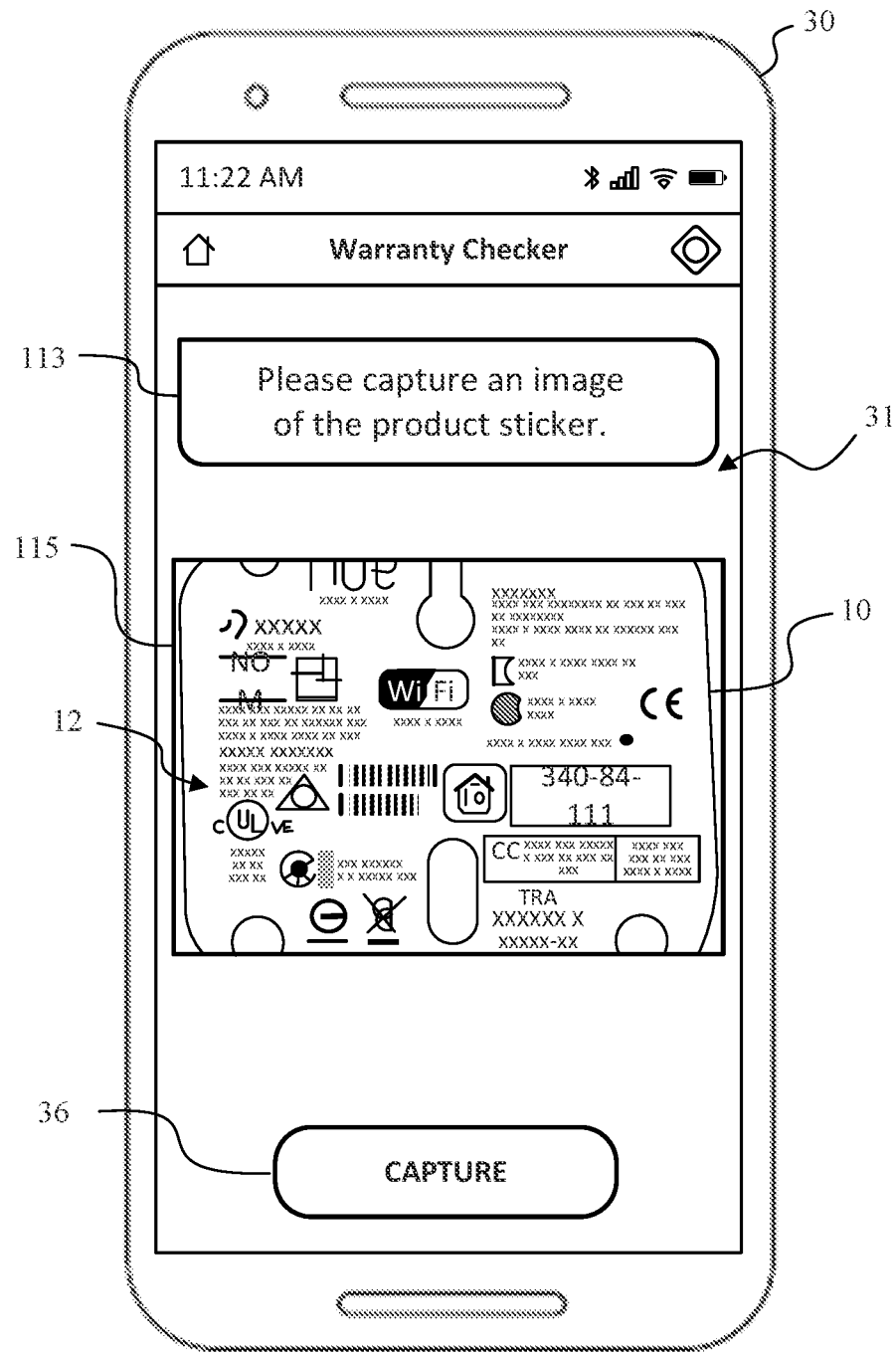

FIG. 3 illustrates a sequence diagram depicting exemplary network communications between an entity's mobile communications device 30 and the WSC 50 via at least one network 40 during operations of the remote artificial intelligence-assisted electronic warranty verification session 100. FIG. 4 illustrates certain aspects of the remote artificial intelligence-assisted electronic warranty verification session 100 from the perspective of the entity 20 seeking warranty verification with respect to a specific product 10, according to one embodiment. FIGS. 5A-5B illustrate exemplary interactive applications relating to the remote artificial intelligence-assisted electronic warranty verification session 100 as displayed on the entity's mobile communications device 30 illustrated in FIG. 4.

In FIG. 3, the WSC 50 may be configured to transmit information, such as instructions to capture an image, to the entity's mobile communications device 30 over the at least one network 40 during certain operations of remote artificial intelligence-assisted electronic warranty verification session 100. The WSC 50 may also be configured to receive information, such as data corresponding to captured images, from the mobile communications device 30 over the at least one network 40 during certain operations of the remote artificial intelligence-assisted electronic warranty verification session 100. For example, the WSC 50 may transmit a product image capture instruction 112 to the entity's mobile communications device 30, receive at least one product image 114 from the entity's mobile communications device 30, transmit a purchase receipt image capture instruction 116 to the entity's mobile communications device 30, receive at least one purchase receipt image 118 from the entity's mobile communications device 30, and transmit an indication of warranty coverage 120 with respect to a product for which warranty verification is sought to the entity's mobile communications device 30 during certain operations of the remote artificial intelligence-assisted electronic warranty verification session 100.

As illustrated in FIG. 4, the entity 20 seeking warranty verification with respect to a specific product 10 for which warranty verification is sought is depicted holding the mobile communications device 30 with a product image capture instruction 112 displayed on a display unit 31 of the mobile communications device 30. The product image capture instruction 112 may be transmitted to the entity's mobile communications device 30 during the operations of the remote artificial intelligence-assisted electronic warranty verification session 100 depicted in FIG. 3. The product image capture instruction 112 may relate to an instruction and/or guidance directing the entity 20 to capture at least one product image 114 of the specific product 10 for which warranty verification is sought and/or images of identifying items 11 (e.g., recognizable text such as characters and/or symbols) on said product 10. The product image capture instruction 112 may be presented via an interactive application on a mobile communications device 30. The interactive application may enable the entity 20 to easily exchange information with the WSC 50 via at least one network 40 in order to obtain an indication of warranty coverage. Optionally, the interactive application may superimpose and anchor markers 34 onto image data relating to the image to be captured.

In one embodiment, the interactive application may enable the entity 20 seeking warranty verification to capture images of the specific product 10 for which warranty verification is sought and may enable the entity 20 to send image data corresponding to images captured by the mobile communications device 30 to the WSC 50 via at least one network 40. In the example illustrated in FIG. 5A, the interactive application visually displayed on the display unit 31 of the mobile communications device 30 contains a product image capture instruction 112 directing the entity 20 to capture at least one product image 114 of the product 10 for which warranty verification is sought (e.g., "Please capture an image of your product."). The entity 20 may capture at least one product image 114 of the product 10 by selecting, for example by mouse click or finger tap, the widget 36 located on the display unit 31 of the mobile communications device 30 when the product 10 is within the camera's field of view.

In another embodiment of the present disclosure, the instruction may include a direction to capture an image of a manufacturer's product sticker. As defined herein, a manufacturer's product sticker may relate to any label, stamp, engraving, writing, or marking on which information and/or symbols about the product or item may be printed, etched, or otherwise applied, or multiple combinations thereof, to the product for which warranty verification is sought. Information and/or symbols included on the manufacturer's product sticker may include marks, logos, product codes (e.g., 2D barcode), or any other indications which may provide a unique identifier that manufacturers, resellers, logistics companies, retail outlets, and warranty service centers may use to quickly identify a specific product. It is to be understood that the manufacturer's product sticker, as utilized herein, is not limited to a single product sticker of the supplier and may encompass a single product sticker and/or multiple product stickers from a variety of sources such as a manufacturer's agent, resellers, logistics companies, retail outlets, or any other party which may apply identifying information on the product for which warranty verification is sought.

In the example illustrated in FIG. 5B, the interactive application visually displayed on the display unit 31 of the mobile communications device 30 contains a product image capture instruction 113 directing the entity 20 to capture at least one product image 115 of the product sticker 12 of the product 10 for which warranty verification is sought (e.g., "Please capture an image of the product sticker."). The product sticker 12 may include multiple items (e.g., recognizable text such as characters and/or symbols) relating to the product 10 which may include a unique identifier which may be used to quickly identify the specific product 10. The entity 20 may capture at least one product image 115 of the product sticker 12 of the product 10 by selecting the widget 36 located on the display unit 31 of the mobile communications device 30 when the product sticker 12 is within the camera's field of view.

Some embodiments of the present disclosure may involve receiving the at least one product image. In a general sense, the at least one product image of a specific product may relate to the previously discussed at least one product image captured, or otherwise obtained, by an entity seeking warranty verification of the specific product. The at least one product image may be received by a warranty service center from a mobile communications device via at least one network. For example, an entity may capture and transmit a product image of the specific product for which warranty verification is sought to the warranty service center from the entity's mobile communications device via at least one network. The at least one network may be similar to the at least one network previously discussed.

In the sequence diagram of FIG. 3 illustrating exemplary network communications between an entity's mobile communications device 30 and the WSC 50 via at least one network 40, the WSC 50 may be configured to receive information, such as data corresponding to captured images, from the mobile communications device 30 over the at least one network 40 during certain operations of the remote artificial intelligence-assisted electronic warranty verification session 100. As illustrated in FIGS. 4 and 5A-5B, the mobile communications device 30 may enable an entity 20 to capture at least one product image 114 of the specific product 10 and/or identifying items 11 (e.g., stickers or recognizable text such as characters and/or symbols) associated with said product 10. Upon capturing the at least one product image 114, the WSC 50 may be configured to receive the at least one product image 114 pertaining to the product for which warranty verification is sought from the entity's mobile communications device 30 over the at least one network 40. In the example illustrated in FIGS. 5A-5B, the WSC 50 may receive the at least one product image 114 once the entity 20 selects the widget 36 of the interactive application located on the display unit 31 of the mobile communications device 30.

Some embodiments of the present disclosure may involve performing product image analysis on the at least one product image to identify at least one product-distinguishing characteristic. As defined herein, performing an image analysis may refer to any process in which a computer or electrical device automatically studies an image or image data to obtain or extract useful information from it. Alternatively, or additionally, performing an image analysis may include analyzing the image data to obtain reprocessed image data, and subsequently analyzing the image data and/or the preprocessed image data to obtain the desired outcome. One of ordinary skill in the art will recognize that the following are non-limiting examples and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a non-linear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain, a Discrete Fourier Transform of at least part of the image data, a Discrete Wavelet Transform of at least part of the image data, a time/frequency representation of at least part of the image data, a representation of at least part of the image data in a lower dimension, a lossy representation of at least part of the image data, a lossless representation of at least part of the image data, a time ordered series of any of the above, and/or any combination of the above. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to edges, corners, blobs, ridges, Scale Invariant Feature Transform (SIFT) features, temporal features, and so forth.

In some embodiments, analyzing image data may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result. Additionally, analyzing image data may comprise analyzing pixels, voxels, point cloud, range data, etc. included in the image data.

As used herein, performing product image analysis may relate to any of the above-mentioned techniques for performing image analysis with respect to the previously discussed at least one product image in order to identify at least one product-distinguishing characteristic. The at least one product-distinguishing characteristic may relate to any distinguishing trait, quality, and/or property of the product and/or identifying items (e.g., stickers, logos, or recognizable text such as characters and/or symbols) unique to said product. The control system of the warranty service center may recognize a purchased product by visually analyzing the product image based on at least one product-distinguishing characteristic of the purchased product. Additionally, or alternatively, the control system of the warranty service center may recognize product specific details by visually analyzing a sticker of the product based on at least one product-distinguishing characteristic of the sticker. The at least one product-distinguishing characteristic may enable the system to recognize or otherwise identify, by way of visual analysis, the specific product for which warranty verification is sought.

Figure 6:
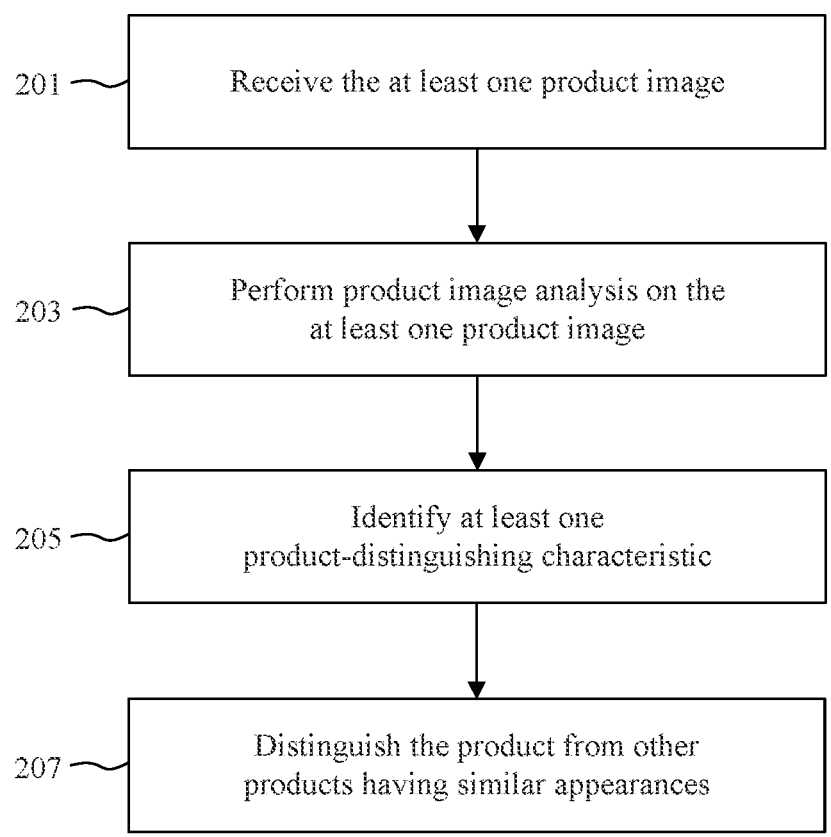
FIG. 6 is a flow chart illustrating exemplary image analysis operations of the remote artificial intelligence-assisted electronic warranty verification session related to at least one product image, as illustrated in FIGS. 5A-5B.

FIG. 6 is a flow chart illustrating exemplary image analysis operations of the remote artificial intelligence-assisted electronic warranty verification session related to at least one product image, consistent with some embodiments of the present disclosure. The following non-limiting embodiments are presented with reference to the flow chart of FIG. 6 together with the block diagram of FIG. 2 and the exemplary interactive applications illustrated in FIGS. 5A-5B.

During the remote artificial intelligence-assisted electronic warranty verification session, a system of the warranty service center may be configured to receive at least one product image at Step 201, perform product image analysis on the at least one product image at Step 203, and identify at least one product-distinguishing characteristic at Step 205. In one embodiment, the control system 60 of FIG. 2 may be configured to receive the at least one product image from the mobile communications device via I/O unit 68. The at least one product image received from the mobile communications device received at Step 201 may be processed and analyzed by the control unit 61 at Steps 203 and 205. For example, the image processing module 161 of the control unit 61 may be configured and operable to process the at least one product image of the specific product for which warranty verification is sought and the image analysis module 163 may be configured and operable to analyze the at least one product image.

Upon performing product image analysis on the at least one product image at Step 203, the image analysis module 163 may be configured to identify at least one product-distinguishing characteristic of the specific product for which warranty verification is sought at Step 205. Various image analysis and/or processing tools may be employed by the control unit 61, for example the image analysis module 163, to analyze the at least one product image and identify at least one product-distinguishing characteristic of the product. Optionally, certain image processing and/or image analysis operations may be performed by the entity's mobile communication device and/or a remote server. In some embodiments, a memory (e.g., memory unit 66) and/or data structures may be accessed by the control unit 61 to enable the control unit 61 to identify at least one product-distinguishing characteristic based on reference data stored in the memory and/or data structures. For example, the memory unit 66 may store a variety of distinguishing traits, qualities, and/or properties corresponding to a number of products and/or identifying items unique to a number of products.

In another embodiment of the present disclosure, the product image analysis may include using artificial intelligence to distinguish the product from other products having similar appearances. As defined herein, using artificial intelligence during product image analysis may refer to any of the above discussed artificial intelligence techniques. Such techniques may enable machine learning through absorption of significant volumes of unstructured data such as text, images, and/or videos, as well as user preferences analyzed over a period of time. For example, product image analysis may relate to employing machine learning, deep learning, and/or neural network processing techniques to perform image analysis with respect to the previously discussed at least one product image in order to identify at least one product-distinguishing characteristic and/or distinguish the product at issue from other products having similar appearances. Other products having similar appearances may refer to any trait, quality, and/or property of the product and/or identifying items which may closely resemble, or in some instances be identical to, products other than the product for which warranty verification is sought. Any suitable computing system or group of computing systems may be used to implement the analysis of the at least one product image using artificial intelligence.

During the remote artificial intelligence-assisted electronic warranty verification session, a system of the warranty service center may be configured to receive at least one product image at Step 201, perform product image analysis on the at least one product image at Step 203, identify at least one product-distinguishing characteristic at Step 205, and distinguish the product from other products having similar appearances using artificial intelligence at Step 207. Upon identifying at least one product-distinguishing characteristic of the specific product for which warranty verification is sought at Step 205, various artificial intelligence techniques may be employed by the control unit 61, for example the image analysis module 163, to analyze the at least one product image and distinguish the product from other products having similar appearances.

In another embodiment of the present disclosure, the product image analysis may include performing optical character recognition on the product image. As used herein, the term optical character recognition (OCR) may refer to the electronic or mechanical conversion of images of typed, handwritten or printed text into machine-encoded text. Using OCR on the at least one product image may relate to the processing of an image or images containing text which may be converted into machine-readable form. The product image analysis may include using OCR on the at least one product image in order to identify at least one product-distinguishing characteristic from text on the product and/or distinguish the product at issue from other products having similar markings.

During the operations of the remote artificial intelligence-assisted electronic warranty verification session illustrated in FIG. 6, OCR may be performed on the product image before, during, or after Step 203, Step 205, and or Step 207. For example, upon receiving the product image from the mobile communications device at Step 201, the OCR module 162 of the control unit 61 illustrated in FIG. 2, may be configured to perform OCR on text included in the product image such that characters located in the image may be identified and converted to machine readable text. The OCR module 162 may be configured to perform OCR before the image analysis module 163 analyzes the at least one product image at Step 203. In another example, the OCR module 162 of the control unit 61 may be configured to perform OCR on the product image such that the image processing module 161 may be configured to utilize the readable text from the product image to identify the at least one product image at Step 205 and/or distinguish the product in the at least one product image from other products having similar appearances at Step 207 by more precisely comparing text on the product for which warranty verification is sought against other products having similar markings.

In another embodiment of the present disclosure, when the product image capture instruction includes a direction to capture an image of a manufacturer's product sticker, the product image analysis may include employing artificial intelligence to interpret the manufacturer's product sticker. The direction to capture an image of a manufacturer's product sticker may be similar to the direction to capture an image of a manufacturer's product sticker previously discussed. Additionally, in a general sense, employing artificial intelligence to interpret the manufacturer's product sticker may occur in a manner similar to using artificial intelligence during product image analysis, as previously discussed.

In the example illustrated in FIG. 5B, a system of the warranty service center may be configured to perform artificial intelligence-based image analysis on the at least one product image 115 to interpret the manufacturer's product sticker 12. In one embodiment, the OCR module 162 and/or the image analysis module 163 of the control unit 61 illustrated in FIG. 2 may be configured and operable to process and analyze the at least one product sticker 12 of the product 10 for which warranty verification is sought. For example, upon receiving the product image from the mobile communications device at Step 201 of FIG. 6, the OCR module 162 and/or the image analysis module 163 may be configured to perform OCR on text included in the product image such that characters contained in the image may be identified and converted to machine readable text which may be analyzed using artificial intelligence.

In one embodiment, the image analysis module 163 may be configured to analyze the at least one product image containing at least one product sticker using artificial intelligence at Step 203. In another embodiment, the image analysis module 163 may be configured to utilize the readable text from the product image containing at least one product sticker to identify the at least one product using artificial intelligence at Step 205. In yet another embodiment, the image analysis module 163 may be configured to distinguish the product in the at least one product image from other products using artificial intelligence at Step 207 by more precisely comparing text on the sticker of the product for which warranty verification is sought against other products having similar markings. Optionally, the image analysis module 163 may be configured to perform image analysis of the product sticker contained in the at least one product image before, during, or after Step 203, Step 205, and or Step 207.

Some embodiments of the present disclosure may involve transmitting an instruction to the entity to capture an image of a purchase receipt for the specific product. As described herein, a purchase receipt for the specific product may relate to a single image, a burst of images, a screenshot, and/or a video of a receipt including the product for which warranty verification is sought. The purchase receipt may relate to any medium (physical or digital) which acknowledges that value has been transferred at a certain time, establishes ownership of an item, or otherwise represents proof of a transaction. The purchase receipt may include a store name, date, purchased product, purchase price, original price, item number, SKU number, barcode, and/or any other identifying information associated with a purchased item or items and the transaction details of said item or items. In a general sense, the instruction to capture an image of a purchase receipt for the specific product may be similar to aspects of the instruction to capture at least one product image of a specific product previously discussed. Moreover, transmitting the instruction to the entity to capture an image of a purchase receipt for the specific product may occur in a manner similar to transmitting the instruction to an entity to capture at least one product image of a specific product previously discussed.

Figure 7:
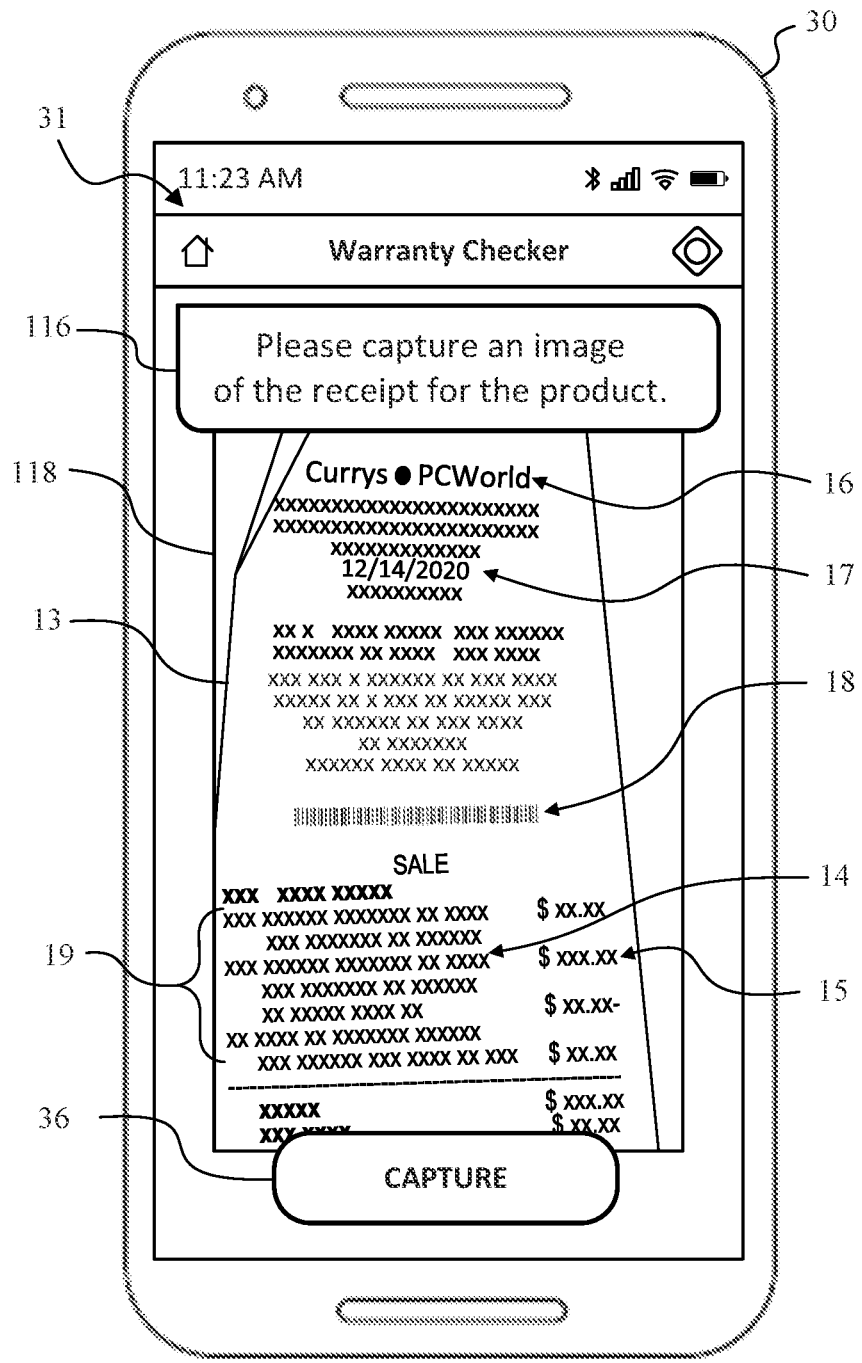
FIG. 7 illustrates an exemplary interactive application relating to the remote artificial intelligence-assisted electronic warranty verification session displayed on an entity's mobile communications device, as illustrated in FIG. 4.

Turning back to the sequence diagram of FIG. 3 illustrating exemplary network communications between an entity's mobile communications device 30 and the WSC 50 via at least one network 40, the WSC 50 may be configured to transmit a purchase receipt image capture instruction 116 pertaining to the product for which warranty verification is sought to the entity's mobile communications device 30 over the at least one network 40 during a remote artificial intelligence-assisted electronic warranty verification session 100. FIG. 7 illustrates one exemplary interactive application including a purchase receipt image capture instruction 116, as displayed on a mobile communications device 30, during the remote artificial intelligence-assisted electronic warranty verification session 100 illustrated in FIG. 3.

The purchase receipt image capture instruction 116 may relate to an instruction and/or guidance directing the entity to capture at least one purchase receipt image 118 of a purchase receipt 13 identifying the specific product for which warranty verification is sought. The purchase receipt 13 may include identifying and/or transaction information associated with a purchased item. In one embodiment, the purchase receipt 13 may include a listing 14 of the specific product, a purchase price 15 of the specific product, a store name 16 of the store from which the specific product was purchased, a purchase date 17, and/or a barcode 18. Additionally, the purchase receipt 13 may include a plurality of purchased products 19 including the specific product for which warranty verification is sought.

In one embodiment, the purchase receipt image capture instruction 116 may be presented via an interactive application on the mobile communications device 30. In a general sense, the purchase receipt image capture instruction 116 may be presented via an interactive application in a manner similar to the presentation of the instruction to an entity to capture at least one product image of a specific product previously discussed. In the example illustrated in FIG. 7, the interactive application visually displayed on the display unit 31 of the mobile communications device 30 contains a purchase receipt image capture instruction 116. The purchase receipt image capture instruction 116 may include an instruction directing the entity to capture at least one purchase receipt image 118 of the purchase receipt 13 including the listing 14 of the specific product for which warranty verification is sought (e.g., "Please capture an image of the receipt for the product."). The entity may capture at least one purchase receipt image 118 of the purchase receipt 13 by selecting the widget 36 located on the display unit 31 of the mobile communications device 30 when the purchase receipt 13 is within the camera's field of view.

Some embodiments of the present disclosure may involve receiving the purchase receipt image. In a general sense, the purchase receipt image pertaining to a specific product for which warranty verification is sought may relate to the previously discussed purchase receipt image captured, or otherwise obtained, by an entity seeking warranty verification of the specific product. The purchase receipt image may be received by a warranty service center from a mobile communications device via at least one network in a manner similar to receiving the at least one product image of a specific product previously discussed. For example, an entity may capture and transmit a receipt image of the receipt pertaining to the specific product for which warranty verification is sought to the warranty service center from the entity's mobile communications device via at least one network. The at least one network may be similar to the at least one network previously discussed.

In the sequence diagram of FIG. 3 illustrating exemplary network communications between an entity's mobile communications device 30 and the WSC 50 via at least one network 40, the WSC 50 may be configured to receive the purchase receipt image 118 from the entity's mobile communications device 30 during the remote artificial intelligence-assisted electronic warranty verification session 100. As illustrated in FIG. 7, the mobile communications device 30 may enable an entity to capture a purchase receipt image 118 corresponding to the purchase receipt 13. The purchase receipt image 118 may identify a listing 14 of the specific product, a purchase price 15 of the specific product, a store name 16 of the store from which the specific product was purchased, a purchase date 17, a barcode 18, as well as a plurality of purchased products. Upon capturing the purchase receipt image 118, the WSC 50 may be configured to receive the purchase receipt image 118 identifying the specific product for which warranty verification is sought from the entity's mobile communications device 30 over the at least one network 40. In the example illustrated in FIG. 7, the WSC 50 may receive the at least one product image 114 once the entity 20 selects the widget 36 of the interactive application located on the display unit 31 of the mobile communications device 30.

Some embodiments of the present disclosure may involve performing receipt image analysis on the received purchase receipt image to identify product purchase information including a purchased product identity and a purchase date. As used herein, performing receipt image analysis may relate to any of the above mentioned techniques for performing image analysis with respect to the previously discussed purchase receipt image in order to identify product purchase information. The product purchase information may refer to any identifying and/or transaction information associated with a purchased item which may enable the system to recognize or otherwise identify, by way of visual analysis, the purchase details of the product for which warranty verification is sought. The identifying information in the receipt may include a store name, date, purchased product, purchase price, original price, item number, SKU number, barcode, and/or any other identifying information associated with a purchased item or the transaction details of said item. In a general sense, performing receipt image analysis on the received purchase receipt image may occur in a manner similar to performing product image analysis, as previously discussed.

Figure 8:
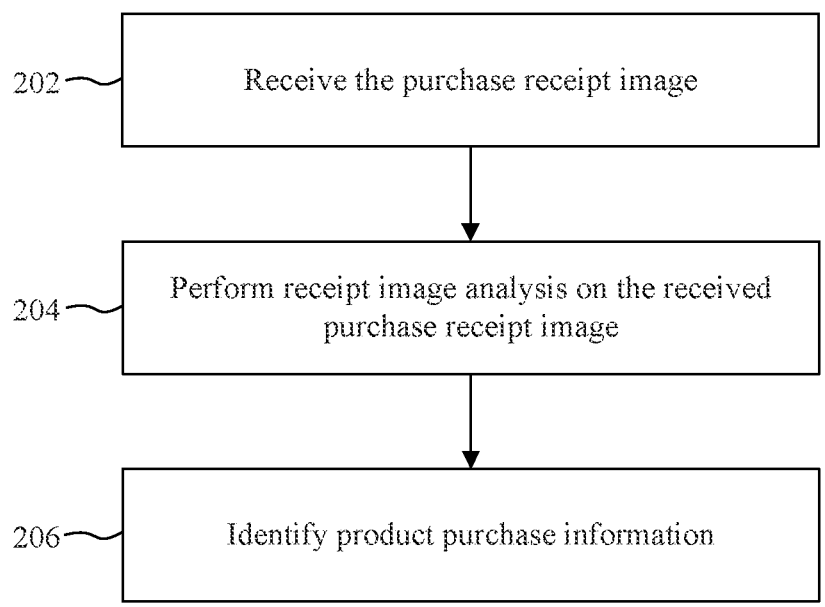
FIG. 8 is a flow chart illustrating exemplary image analysis operations of the remote artificial intelligence-assisted electronic warranty verification session related to a purchase receipt image, as illustrated in FIG. 7.

FIG. 8 is a flow chart illustrating exemplary image analysis operations of the remote artificial intelligence-assisted electronic warranty verification session related to a purchase receipt image, consistent with some embodiments of the present disclosure. The following non-limiting embodiments are presented with reference to the flow chart of FIG. 8 together with the block diagram of FIG. 2 and the exemplary interactive application illustrated in FIG. 7.

During the operations of the remote artificial intelligence-assisted electronic warranty verification session illustrated in FIG. 8, a system of the warranty service center may be configured to receive the purchase receipt image at Step 202, perform receipt image analysis on the received purchase receipt image at Step 204, and identify product purchase information at Step 206. In one embodiment, the control system 60 of FIG. 2 may be configured to receive the purchase receipt image from the mobile communications device via I/O unit 68. The purchase receipt image received from the mobile communications device at Step 202 may be processed and analyzed by the control unit 61 at Steps 204 and 206. For example, the image processing module 161 of the control unit 61 may be configured and operable to process the purchase receipt image of the product for which warranty verification is sought and the image analysis module 163 may be configured and operable to analyze the purchase receipt image.

Upon performing purchase receipt image analysis on the at least one purchase receipt image at Step 203, the image analysis module 163 may be configured to identify product purchase information contained in the product receipt such as the product identity and the purchase date of the specific product for which warranty verification is sought at Step 205. The image analysis module 163 may be further configured to identify product purchase information from a store name, purchase price, original price, item number, SKU number, barcode, and/or any other identifying information associated with a purchased item or items and the transaction details of said item or items. Various image analysis and/or processing tools may be employed by the control unit 61 with respect to the image purchase receipt. In a general sense, performing image analysis to interpret the purchase receipt image, or otherwise identify product purchase information may occur in a similar manner to performing image analysis of the product image containing the product and/or manufacturer's product sticker. For example, the receipt image analysis may include employing artificial intelligence and/or OCR in a manner similar to employing artificial intelligence and/or OCR to interpret the product image containing the product and/or manufacturer's product sticker, as previously discussed. In employing artificial intelligence and/or OCR to analyze the purchase receipt image, the image analysis module 163 may be configured to identify an identity of the purchased product, the purchase date, and/or an identity of an establishment from which the product was purchased.

Another embodiment of the present disclosure may involve determining that the image of the purchase receipt identifies a plurality of purchased products and transmitting a request to the entity to identify a specific one of the plurality of purchased products. As used herein, a plurality of purchased products may relate to any number of products that are included on the purchase receipt containing the product for which warranty verification is sought. Alternatively, the plurality of purchased products may relate to any number of products that are included in the field of view of the mobile communications device's camera when the image of the purchase receipt is captured. In a general sense, performing receipt image analysis on the received purchase receipt image containing a plurality of purchased products may occur in a manner similar to performing product image analysis, as previously discussed. Additionally, the request may be transmitted to the mobile communications device in a manner similar to the instruction to capture at least one product image of the specific product and/or the instruction to capture an image of the purchase receipt.

The plurality of purchased products contained in the receipt may share some similarities in identifying information such as a store name, date, purchased product, purchase price, original price, item number, SKU number, barcode, and/or any other identifying information associated with a purchased item or the transaction details of said item. In some instances, the system may be able to determine the relevant product based on the product image previously obtained. In other instances, the system may request that the entity identify a specific one of the plurality of purchased products.

The request to identify a specific one of the plurality of purchased products may relate to, for example, a physical indication such as pointing out the specific product on the receipt with a pointer (e.g., a finger or pen) or marking the specific product on the receipt (e.g., circling or highlighting the product on the receipt). Alternatively, the request to the entity to identify a specific one of the plurality of purchased products may relate to, for example, a digital indication such as annotating and/or marking the specific product on the receipt via an interactive application. In another embodiment of the present disclosure, the request to identify the specific one of the plurality of purchased products includes a request to capture an image of the receipt with an indication in the image identifying the specific one of the plurality of purchased products. In a general sense, the request to capture an image of the purchase receipt with an indication in the image identifying the specific one of the plurality of purchased products may be similar to the request to the entity to capture an image of the purchase receipt for the product, as previously discussed.

Figure 9:
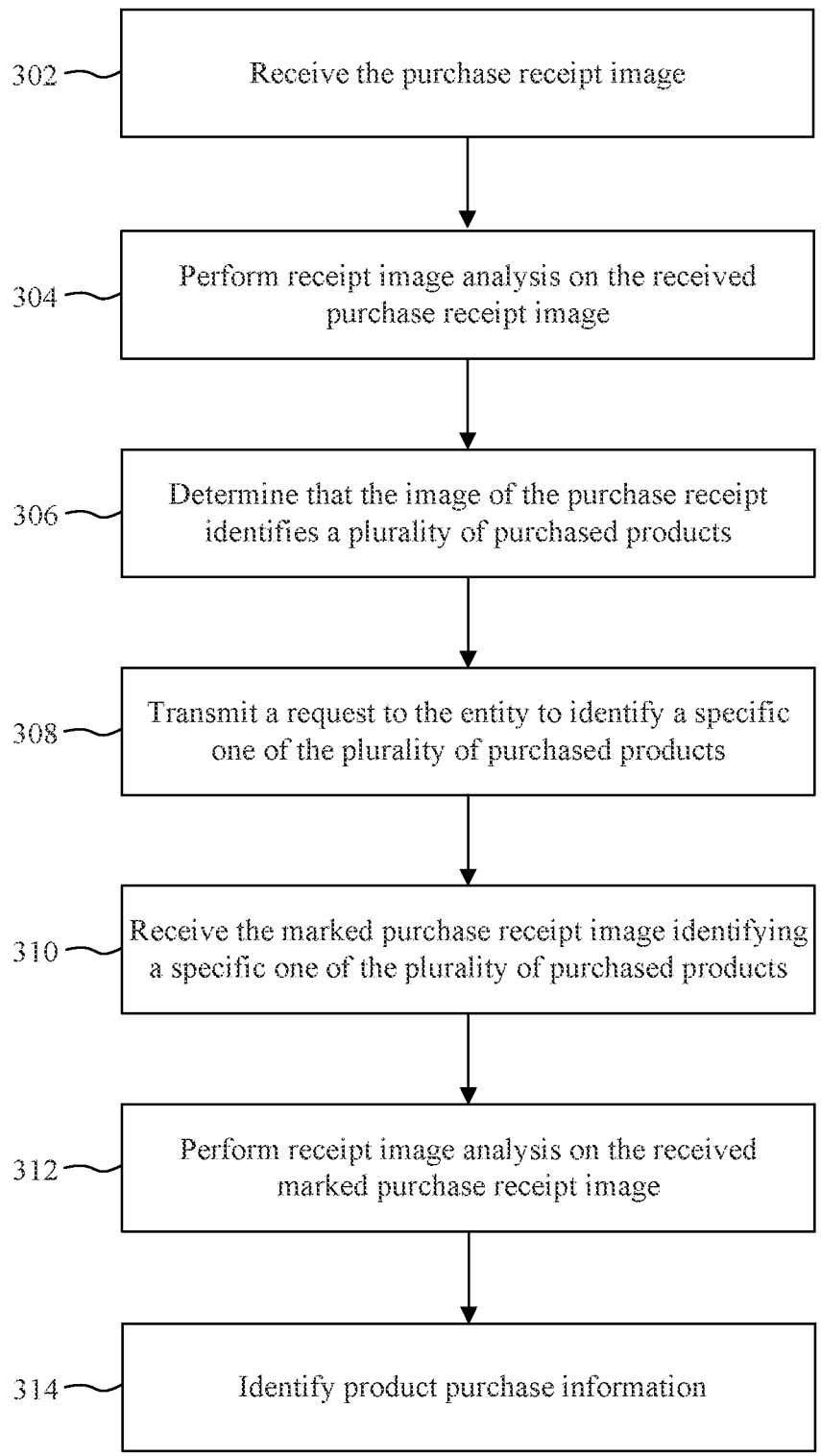
FIG. 9 is a flow chart illustrating exemplary image analysis operations of the remote artificial intelligence-assisted electronic warranty verification session related to a purchase receipt image containing a plurality of products, as illustrated in FIG. 7.

FIG. 9 is a flow chart illustrating exemplary image analysis operations of the remote artificial intelligence-assisted electronic warranty verification session related to a purchase receipt image 118 of a purchase receipt 13 containing a plurality of purchased products 19, as illustrated in FIG. 7. During the operations of the remote artificial intelligence-assisted electronic warranty verification session illustrated in FIG. 9, a system of the warranty service center may be configured to receive the purchase receipt image at Step 302, perform receipt image analysis on the received purchase receipt image at Step 304, determine that the image of the purchase receipt identifies a plurality of purchased products at Step 306, transmit a request to the entity to identify a specific one of the plurality of purchased products at Step 308, receive the marked purchase receipt image identifying a specific one of the plurality of purchased products at Step 310, perform receipt image analysis on the received marked purchase receipt image at Step 312, and identify product purchase information at Step 314.

According to some embodiments of the present disclosure, the remote artificial intelligence-assisted electronic warranty verification operations may involve accessing a universal data structure containing data on products offered by a plurality of suppliers. As used herein, the term data structure may relate to a more advanced knowledge-base database from which options, such as a fixed set of prioritized operations, are selected based on some environment of usage conditions. The data structure may include an artificial intelligence-based system that has been trained with data of past cases, their conditions, and/or the optimal solution of each case. The data structure may include one or more memory devices that store data and/or instructions. The data structure may utilize a volatile or non-volatile, magnetic, semiconductor, tape, optical, removable, non-removable, other type of storage device or tangible or non-transitory computer readable medium, or any medium or mechanism for storing information. The data structure may include any plurality of suitable data structures, ranging from small data structures hosted on a workstation to large data structures distributed among data centers. The data structure may also include any combination of one or more data structures controlled by memory controller devices (e.g., server(s), etc.) or software.

The data structure may include a database which may relate to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein is inclusive in the singular is inclusive of plural data structures.

Accessing a universal data structure, as used herein, may include reading and/or writing information from/to the universal data structure. The universal data structure may include any repository of data on a variety of products offered by a plurality of suppliers. The repository may include one or more of product data, transaction data, and supplier data. The repository may be located in one location or distributed across a plurality of locations. The data in the universal data structure may relate to any identifying information corresponding to any product offered by a plurality of suppliers stored in a data structure of, or otherwise accessible to, the warranty service center. The term plurality of suppliers, as used herein, may include manufacturers, agents of the manufacturers, resellers, logistics companies, retail outlets, and/or any other party which may be involved in handling a product during any point of the supply chain. The types of identifying information contained in the universal data structure may be similar to the types of identifying information associated with a purchased product or product sticker included on/in said product and/or may be similar to the types of transaction details corresponding to said product, as discussed above.

Figure 10:
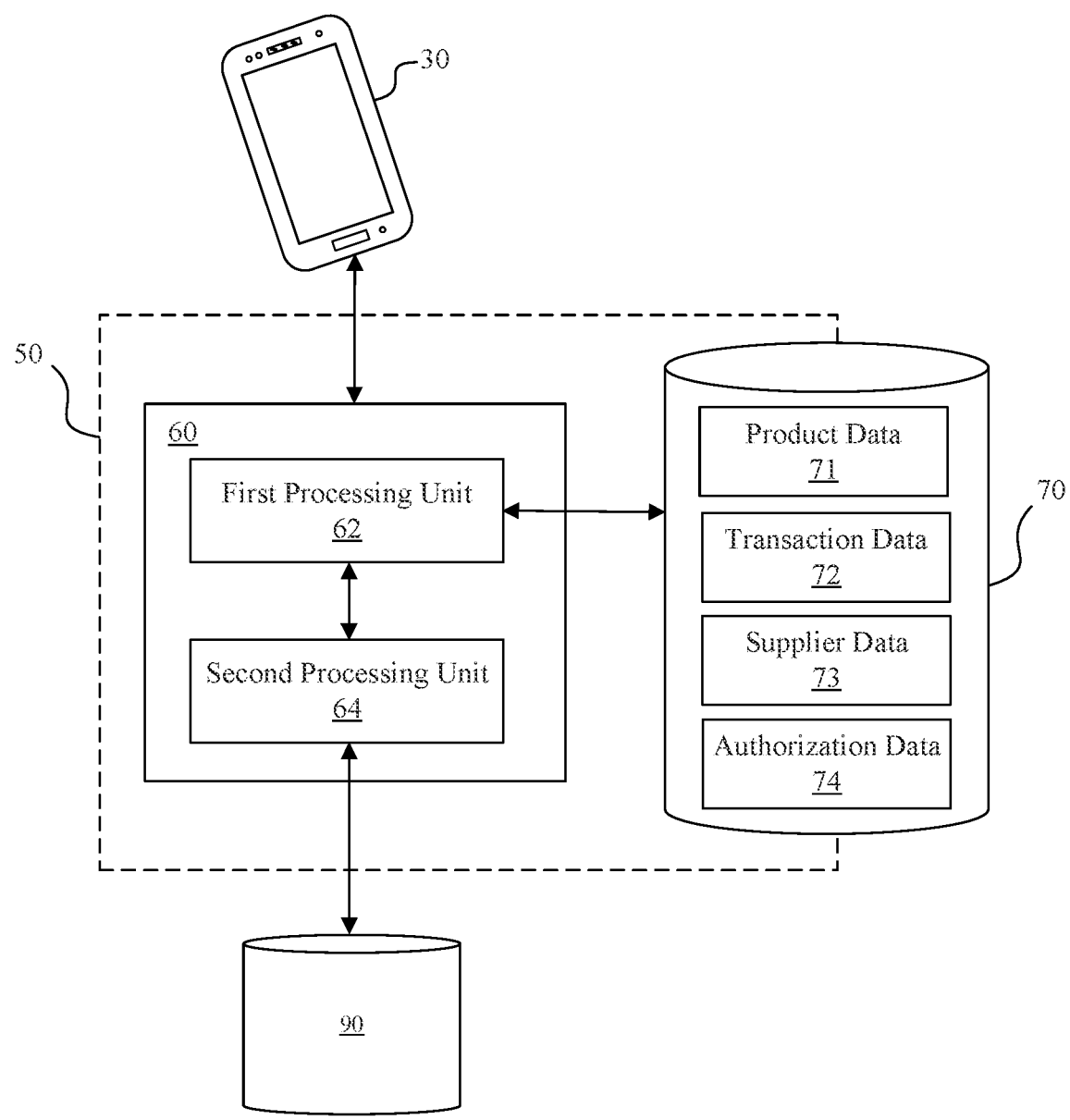
FIG. 10 is a functional block diagram schematically illustrating certain aspects of a remote artificial intelligence-assisted electronic warranty verification session, consistent with at least one embodiment of the present disclosure.

FIG. 10 is a functional block diagram schematically illustrating certain aspects of a remote artificial intelligence-assisted electronic warranty verification session, consistent with at least one embodiment of the present disclosure. The following non-limiting embodiments are presented with reference to the functional block diagram of FIG. 10 together with the block diagram of the control system 60 illustrated in FIG. 2.

In FIG. 10, the control system 60 of the WSC 50, may be connected to the universal data structure 70 and the warranty data structure 90 via at least one network and/or at least one server. The control system 60 may be configured to access information stored in the universal data structure 70 and/or information stored in the warranty data structure 90 to interpret information pertaining to the product for which warranty verification is sought as provided by an entity's mobile communications device 30. The universal data structure 70 may include data on a variety of products offered by a plurality of suppliers including product data 71, transaction data 72, and supplier data 73. In one embodiment, the first processing unit 62 may be configured to access information stored in the universal data structure 70 via the comparison module 164 of the first processing unit 62 illustrated in FIG. 2. The warranty data structure 90 may include product data 91, customer data 92, and warranty data 93. The second processing unit 64 may be configured to access information stored in the warranty data structure 90 via the external data access module 167 of the second processing unit 64 illustrated in FIG. 2.

Some embodiments of the present disclosure may involve using the at least one product-distinguishing characteristic obtained from the image analysis on the product image and the product purchase information obtained from the image analysis on the purchase receipt to identify in the universal data structure the specific product. The at least one product-distinguishing characteristic obtained from the product image analysis may be the same as the at least one product-distinguishing characteristic previously discussed. Additionally, the product purchase information obtained from the purchase receipt image analysis may be the same as the product purchase information previously discussed. Identifying information including the at least one product-distinguishing characteristic and the product purchase information may be used to identify, in the universal data structure, the specific product for which warranty verification is sought by cross checking the identifying information obtained from the analysis of the at least one product image and/or purchase receipt image against information stored in the universal data structure. The identifying information may be cross checked against information stored in the universal data structure to verify the correctness and/or authenticity of the product and to obtain supplier data associated with said product which may be used to determine warranty coverage information.

Figure 11:
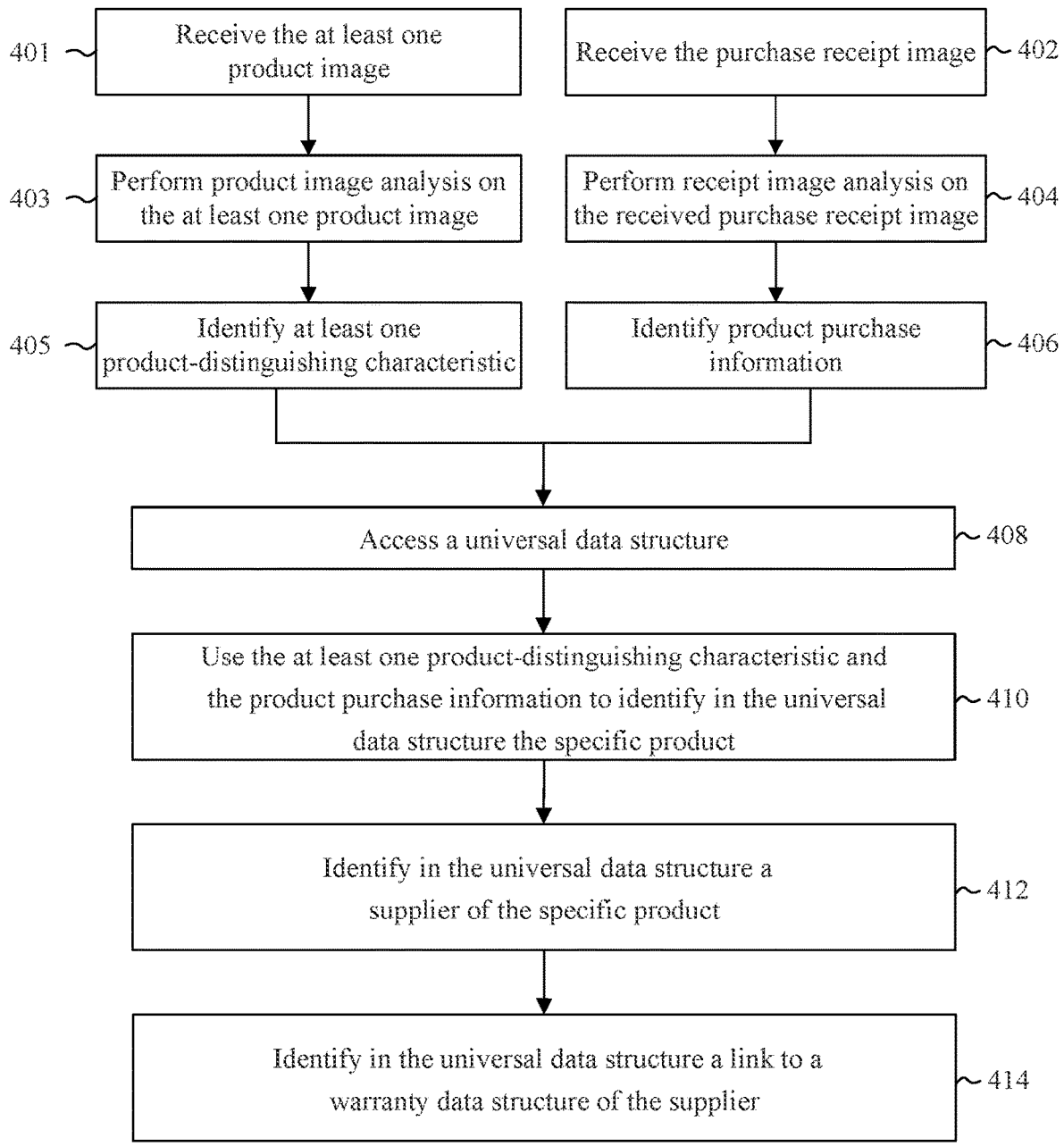
FIG. 11 is a flow chart illustrating exemplary operations of the remote artificial intelligence-assisted electronic warranty verification session related to a universal data structure, consistent with at least one embodiment of the present disclosure.

FIG. 11 is a flow chart illustrating exemplary operations of the remote artificial intelligence-assisted electronic warranty verification session, consistent with at least one embodiment of the present disclosure. The following non-limiting embodiments are presented with reference to the flow chart of FIG. 11 together with the functional block diagram of FIG. 10 and the block diagram of the control system 60 illustrated in FIG. 2.

During the remote artificial intelligence-assisted electronic warranty verification session, a control system 60 of the WSC 50 illustrated in FIG. 10 may be configured to receive at least one product image at Step 401, perform product image analysis on the at least one product image at Step 403, and identify at least one product-distinguishing characteristic at Step 405. In a general sense, Steps 401, 403, and 405 may occur in a manner similar to Steps 201, 203, and 205 previously discussed. Additionally, the control system 60 of the WSC 50 illustrated in FIG. 10 may be configured to receive the purchase receipt image at Step 402, perform receipt image analysis on the received purchase receipt image at Step 404, and identify product purchase information at Step 406. In a general sense, Steps 402, 404, and 406 may occur in a manner similar to Steps 202, 204, and 206 previously discussed.

Upon identifying at least one product-distinguishing characteristic from the at least one product image at Step 405 and product purchase information from the purchase receipt image at Step 406, the control system 60 of the WSC 50 illustrated in FIG. 10 may be configured to access the universal data structure 70 containing stored reference data on a variety of products offered by a plurality of suppliers including product data 71, transaction data 72, and supplier data 73 at Step 408. Upon accessing the universal data structure 70, the comparison module 164 of the control system 60 illustrated in FIG. 2 may be configured and operable to, at Step 410, consult the universal data structure 70 to compare the at least one product-distinguishing characteristic and/or the product purchase information against reference data (e.g., product data 71, transaction data 72, and supplier data 73) stored in the universal data structure 70 in order to identify the specific product for which warranty verification is sought.

In some embodiments, artificial intelligence may be employed by the control system 60 of the WSC 50 and/or by the universal data structure 70 to identify the specific product for which warranty verification is sought at Step 410. For example, the comparison module 164 of the control system 60 illustrated in FIG. 2 may be configured and operable to consult the universal data structure 70 and employ artificial intelligence using data stored in the universal data structure 70 pertaining to "lessons" learned from past support sessions related to a certain class of problem. Additionally, or alternatively, the universal data structure 70 include an artificial intelligence system which may be trained with data corresponding to a variety of products offered by a plurality of suppliers including product data 71, transaction data 72, and/or supplier data 73, their conditions, and/or optimal information obtained during previously conducted remote artificial intelligence-assisted electronic warranty verification sessions.

For example, the universal data structure 70 may be configured and operable to log and analyze the entities and/or suppliers' interactions with the WSC 50 during past warranty verification sessions to quickly recognize identifying and/or transaction information associated with a given product based on trained data at Step 410 of FIG. 11. In this way, the universal data structure 70 may be dynamically constructed such that artificial intelligence techniques, for example machine learning algorithms and/or deep learning algorithms, may be used to rank/weigh each data structure record of the universal data structure 70 according to the number of times it was successfully used to identify a product of a particular type/classification.

In another embodiment of the present disclosure, when the image of the purchase receipt identifies a plurality of purchased products, operations may involve applying artificial intelligence to information from the universal data structure in order to match one of the plurality of purchased products on the receipt with the product-distinguishing characteristic determined from the product image in order to determine the corresponding specific product. In a general sense, applying artificial intelligence to information from the universal data structure in order to match one of the plurality of purchased products on the receipt with the product-distinguishing characteristic determined from the product image in order to determine the corresponding specific product may occur in a manner similar to, and may employ similar techniques as, applying artificial intelligence to identify the specific product for which warranty verification is sought using the product-distinguishing characteristic determined from the product image in view of information stored in the universal data structure, as previously discussed.

The following embodiments are presented with reference to the flow chart of FIG. 11 together with the functional block diagram of FIG. 10 and the block diagram of the control system 60 illustrated in FIG. 2. Upon identifying at least one product-distinguishing characteristic from the at least one product image at Step 405 and identifying that the purchase receipt image contains a plurality of purchased products at Step 406, the comparison module 164 of the control system 60 illustrated in FIG. 2 may be configured to access the universal data structure at Step 408. In this non-limiting example, the product purchase information identified at Step 406 may conditionally correspond to each of the plurality of purchased products identified in the purchase receipt image.

Upon accessing the universal data structure at Step 408, the control system 60 may be configured to use the at least one product-distinguishing characteristic and the product purchase information, including the plurality of purchased products, to identify the specific product in the universal data structure 70 at Step 410. For example, the control system 60 illustrated in FIG. 10 may utilize artificial intelligence to compare the product-distinguishing characteristic determined from the product image against any number of the plurality of purchased products and employ artificial intelligence using data stored in the universal data structure 70 to match one of the plurality of purchased products on the receipt with the product-distinguishing characteristic. In matching one of the plurality of purchased products on the receipt with at least one product-distinguishing characteristic, the control system 60 may utilize the matched data, as well as stored reference data in the universal data structure 70, in order to determine the corresponding specific product for which warranty verification is sought at Step 410.

Some embodiments of the present disclosure may involve identifying in the universal data structure a supplier of the specific product. As discussed above, the term supplier may refer to manufacturers, agents of the manufacturers, resellers, logistics companies, retail outlets, and/or any other party which may be involved in handling a product during any point of the supply chain. As used herein, a supplier of the specific product may relate to any supplier which may possess, or otherwise have access to, warranty information pertaining to the specific product for which warranty verification is sought. In a general sense, identifying a supplier of the specific product in the universal data structure may occur in a manner similar to identifying the specific product in the universal data structure, as previously discussed.

Referring back to the flow chart illustrated in FIG. 11, upon accessing the universal data structure at Step 408 and consulting the universal data structure to compare the at least one product-distinguishing characteristic and/or the product purchase information against reference data stored in the universal data structure in order to identify the specific product for which warranty verification is sought, the control system 60 of the WSC 50 illustrated in FIG. 10 may be configured to identify a supplier of the specific product from information stored in the universal data structure 70 containing stored reference data on a plurality of suppliers as supplier data 73. In one embodiment, the supplier identified in the universal data structure may relate to at least a manufacturer and/or a manufacturer's agent.

Some embodiments of the present disclosure may involve identifying in the universal data structure a link to a warranty data structure of the supplier. As used herein, a link may include any tag, marker, code, or string that defines the relationship between a current location and an external resource. In this instance, a warranty data structure of a supplier may be the external resource. The resource may be considered external if it is maintained by an entity other than the entity that maintains the universal data structure, or if the data is maintained separately from the universal data structure. The data structure of the supplier may be a data structure maintained by or on behalf of a product manufacturer, distributor or an agent associated with the manufacturer or the distributor. For example, a purchaser of a product may register the product's serial number and purchase date in a manner that causes such information to be stored in a warranty data structure of a supplier. The warranty data structure of the supplier may include records of individual purchases and may include more general information about warranty terms associated with particular products provided by the supplier. Alternatively or additionally, the warranty terms may be maintained in the universal data structure. Technically, a link may refer to any type of datalink which may connect one location to another for the purpose of transmitting and/or receiving digital information. The link may enable simplex communications, half-duplex communications, and/or duplex communications with the warranty data structure. In a general sense, identifying a link to a warranty data structure of the supplier in the universal data structure may occur in a manner similar to identifying the specific product in the universal data structure, as previously discussed.

In the functional block diagram of FIG. 10, the universal data structure 70 may contain supplier data 73 on a plurality of suppliers, as well as links corresponding to each of the plurality of suppliers in the supplier data 73. The supplier data 73 stored on the universal data structure 70 may include a link which may enable access to a warranty data structure 90 of the supplier. The link may be used to enable the WSC 50 to communicate with a specific supplier to obtain information corresponding to the identified specific product for which warranty verification is sought. Referring to the flow chart illustrated in FIG. 11, upon identifying a supplier of the specific product from information stored in the universal data structure 70 at Step 412, the control system 60 of the WSC 50 may be configured to identify in the universal data structure 70 a link to a warranty data structure 90 at Step 414.

In another embodiment of the present disclosure, the universal data structure may include an authorization code for accessing the warranty data structure of the supplier. In some instances, access to the warranty information stored in the warranty data structure may be controlled, or otherwise limited, by the supplier. When access to the warranty information stored in the warranty data structure is controlled by the supplier, authorization to access the data may need to be requested by a party seeking access to said information. As used herein, authorization may refer to any permission to use, or otherwise access, software and/or equipment and may be granted by way of an authorization code. An authorization code may include password-based authentication, multi-factor authentication, certificate-based authentication, token-based authentication, or any other set of numbers and/or letters that may be entered into a computer system to prove official permission to use, or otherwise access, software and/or equipment. In some instances, the authorization code may be linked to the universal data structure, such that requests emanating via the universal data structure are automatically authorized. In other instances, specific authorization may be provided from the entity seeking warranty coverage.

In the present disclosure, the universal data structure 70 may contain unique authorization codes as authorization data 74 which may correspond to respective warranty data structures of the plurality of suppliers. In one embodiment, the authorization code stored in, or otherwise accessible to, the universal data structure 70 may permit the control system 60 to use, or otherwise access, the link to the warranty data structure 90 of the supplier. Referring to the flow chart illustrated in FIG. 11, upon identifying a supplier of the specific product from information stored in the universal data structure 70 at Step 412, the control system 60 of the WSC 50 may be configured to identify a link to the warranty data structure 90 of the supplier as well as an authorization code for accessing the warranty data structure 90 in the universal data structure 70 at Step 414.

Some embodiments of the present disclosure may involve accessing the link to perform a remote lookup of the specific product in the warranty data structure of the supplier. In a general sense, the warranty data structure may be similar to the data structures previously discussed. Additionally, the link used to enable access to the warranty data structure of the supplier may be similar to the link to the warranty data structure of the supplier previously discussed.

As used herein, accessing the link to perform a remote lookup of the specific product in the warranty data structure of the supplier may enable the warranty service center to read and/or write information, such as entity-specific warranty data on products offered by a given supplier, from/to the warranty data structure of the supplier via at least one network. Once the warranty service center accesses the link to the warranty data structure of the supplier, a system of the warranty data structure may be able to remotely lookup, search, or otherwise obtain, information stored in the warranty data structure pertaining to a specific product for which warranty verification is sought. The remote lookup may be conducted based on the previously identified specific product in the universal data structure and may be used to verify warranty eligibility of the specific product.

Figure 12:
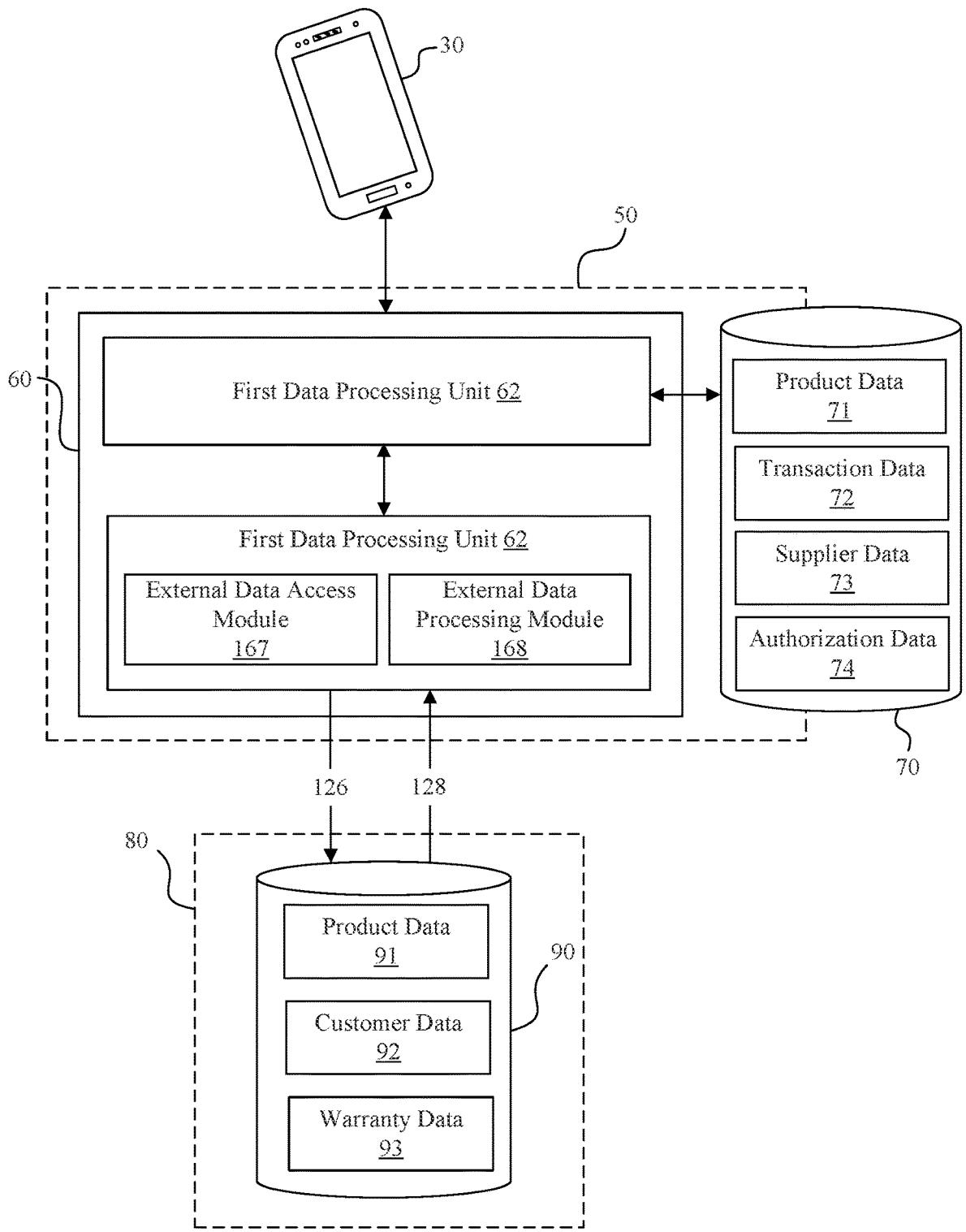
FIG. 12 is a functional block diagram schematically illustrating certain aspects of a remote artificial intelligence-assisted electronic warranty verification session, consistent with at least one embodiment of the present disclosure.

FIG. 12 is a functional block diagram schematically illustrating exemplary network communications between the WSC 50 and the supplier 80 during certain operations of the remote artificial intelligence-assisted electronic warranty verification session. In one embodiment, the control system 60 of the WSC 50 may be configured to communicate with the warranty data structure 90 of the supplier 80 in possession of entity-specific warranty data on products provided by the supplier 80. For example, the second processing unit 64 of the control system 60 may include an external data access module 167 and an external data processing module 168 configured to communicate with the warranty data structure 90. The external data access module 167 may be configured and operable to transmit a remote lookup request 126 to the supplier 80 and to access product data 91, customer data 92, and/or warranty data 93 stored in the warranty data structure 90 of the supplier 80.

Figure 13:
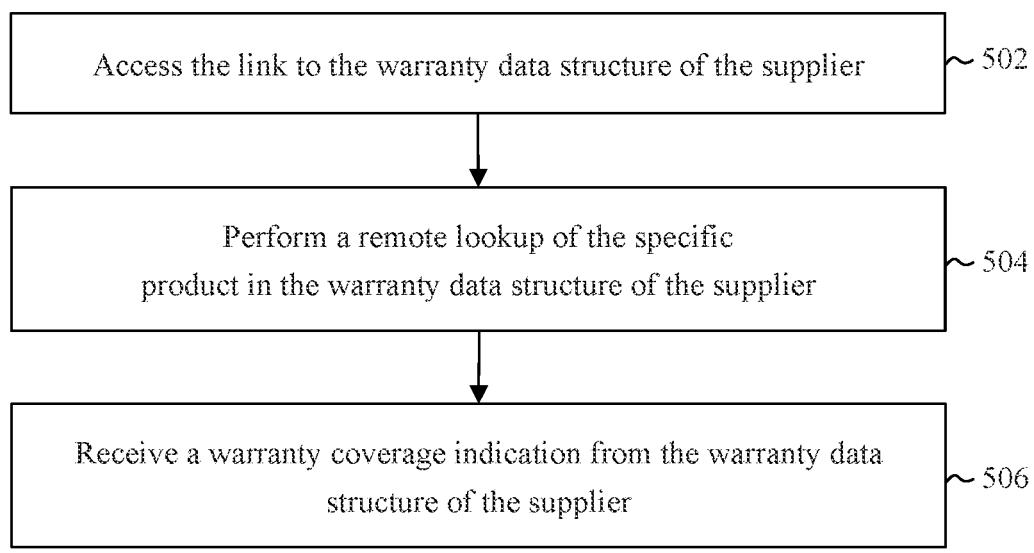
FIG. 13 is a flow chart illustrating exemplary operations of the remote artificial intelligence-assisted electronic warranty verification session involving the warranty service center and the supplier, consistent with at least one embodiment of the present disclosure.

FIG. 13 is a flow chart illustrating exemplary remote artificial intelligence-assisted electronic warranty verification operations in which the WSC may access the link to the warranty data structure of the supplier at Step 502, perform a remote lookup of the specific product in the warranty data structure of the supplier at Step 504, and receive a warranty coverage indication from the warranty data structure of the supplier at Step 506. At Step 502, the external data access module 167 illustrated in FIG. 12 may be configured to access information stored in the warranty data structure 90 via a network link. Accessing the information stored in the warranty data structure 90 may involve transmitting a remote lookup request 126 to the supplier 80. Upon transmitting a remote lookup request 126 to the supplier 80, a remote lookup of the specific product in the warranty data structure 90 of the supplier 80 may be performed at Step 504. The remote lookup request 126 of the specific product in the warranty data structure 90 may be performed directly or indirectly by the external data access module 167 and/or the external data processing module 168 and may enable the external data access module 167 and/or the external data processing module 168 to access product data 91, customer data 92, and/or warranty data 93 stored in the warranty data structure 90. Optionally, the remote lookup request 126 may be a request to the supplier 80 to access product data 91, customer data 92, and/or warranty data 93 stored in the warranty data structure 90.

In another embodiment of the present disclosure, the universal data structure may include an authorization code for accessing the warranty data structure of the supplier and accessing the link may include transmitting the authorization code to the supplier. In a general sense, the authorization code for accessing the warranty data structure of the supplier may be the same as the authorization code for accessing the warranty data structure of the supplier previously discussed and may be transmitted in a manner similar to the previously discussed lookup request. Additionally, aspects of accessing the link may occur in a manner similar to accessing the link to the warranty data structure of the supplier previously discussed.

Figure 14:
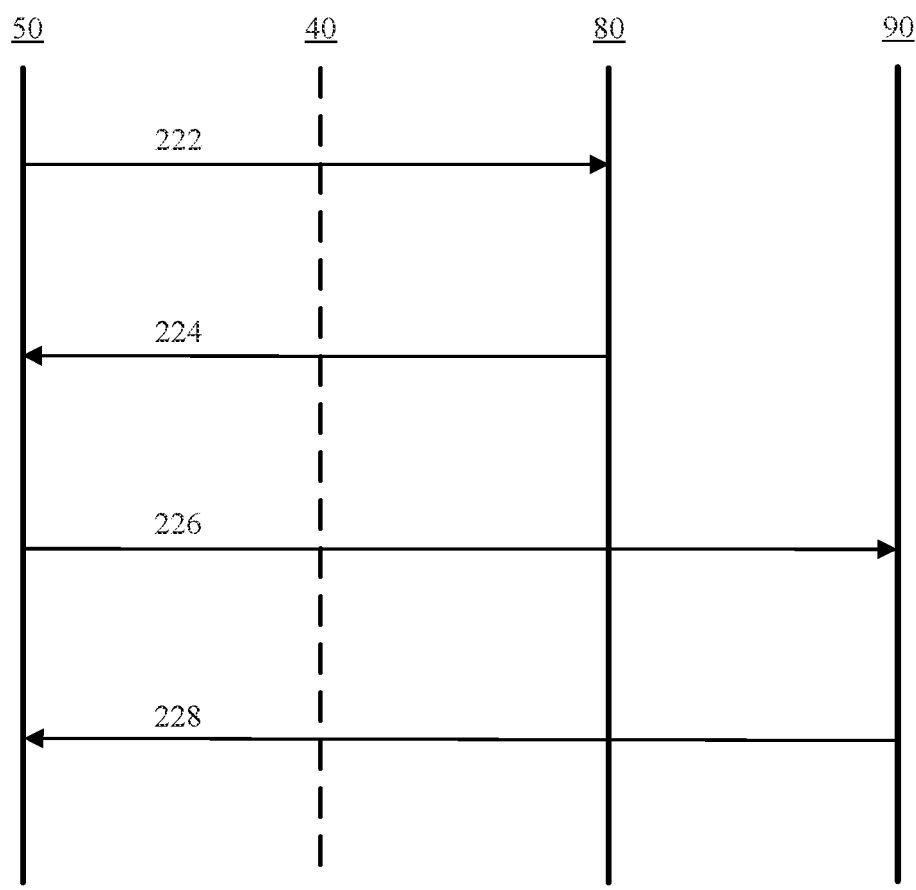
FIG. 14 is a sequence diagram illustrating exemplary network communications between the warranty service center and the supplier via at least one network during a remote artificial intelligence-assisted electronic warranty verification session, consistent with another embodiment of the present disclosure.
Figure 15:
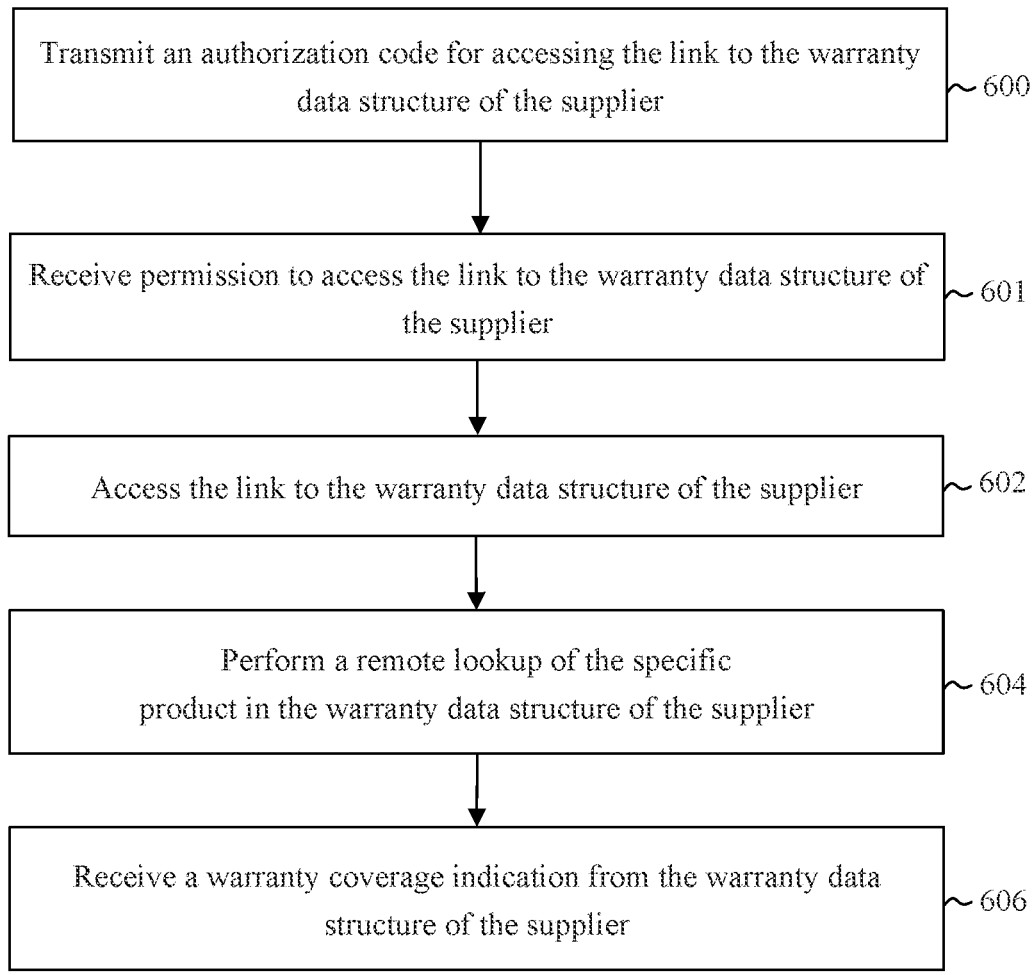
FIG. 15 is a flow chart illustrating exemplary operations of the remote artificial intelligence-assisted electronic warranty verification session involving the warranty service center and the supplier, consistent with another embodiment of the present disclosure.

FIG. 14 illustrates a sequence diagram depicting exemplary network communications between the WSC 50 and the supplier 80 via at least one network 40 during certain operations of a remote artificial intelligence-assisted electronic warranty verification session. The communications between the WSC 50 and the supplier 80 may include an authorization code 222, authorization permission 224, a remote lookup request 226, and a warranty coverage indication 228. FIG. 15 is a flow chart illustrating exemplary remote artificial intelligence-assisted electronic warranty verification operations, consistent with another embodiment of the present disclosure. The following embodiments are presented with reference to the sequence diagram of FIG. 14 and the flow chart of FIG. 15 together with the functional block diagram of FIG. 12.

In one embodiment, the control system 60 of the WSC 50 illustrated in FIG. 12 may require authorization to access the warranty data structure 90 of the supplier 80 in order to access entity-specific warranty data on products provided by the supplier 80. If authorization is required to access data in the warranty data structure 90, the control system 60 may obtain authorization codes from the universal data structure 70 which may permit the control system 60 to use, or otherwise access, the warranty data structure 90 of the supplier. For example, the universal data structure 70 may store, or otherwise make accessible, unique authorization codes as authorization data 74 which may be used to access respective warranty data structures of the plurality of suppliers. Upon identifying an authorization code corresponding to the specific product for which warranty verification is sought, the control system 60 may be configured to use the authorization code to access the warranty data structure 90 of the supplier 80.

During the operations of the remote artificial intelligence-assisted electronic warranty verification session illustrated in FIG. 15, the control system 60 of the WSC 50 illustrated in FIG. 12 may be configured to perform the exemplary network communications illustrated in FIG. 14. In one embodiment, the external data access module 167 illustrated in FIG. 12 may, at Step 600, transmit an authorization code 222 for accessing the link to the warranty data structure 90 to the supplier 80. At Step 601, the external data access module 167 may receive authorization permission 224 to access the link to the warranty data structure 90 from the supplier 80. Upon receiving the authorization permission 224 to access the link, the external data access module 167 may access the link to the warranty data structure 90 of the supplier 80 at Step 602. Accessing the link to the warranty data structure 90 may include transmitting a remote lookup request 226 to the supplier 80. Once access to the warranty data structure 90 has been authorized, the external data access module 167 and/or the external data processing module 168 may perform a remote lookup of the specific product in the warranty data structure 90 of the supplier 80 at Step 604 and receive a warranty coverage indication 228 from the supplier 80 at Step 606.

Some embodiments of the present disclosure may involve receiving a warranty coverage indication from the warranty data structure of the supplier. As used herein, the term warranty coverage indication may relate to any information, such as entity-specific warranty information, which may describe, or otherwise be used to identify the warranty eligibility of the specific product for which warranty verification is sought. The warranty coverage indication may be received, or otherwise accessed by, the warranty control center from the supplier. In a general sense, the receiving of a warranty coverage indication from the warranty data structure of the supplier may occur in a manner similar to the receiving of a warranty coverage indication, as previously discussed.

Referring back to the functional block diagram illustrated in FIG. 12, together with the flow chart of FIG. 13, the control system 60 of the WSC 50 may be configured to receive a warranty coverage indication 128 from the warranty data structure 90 of the supplier 80 via at least one network 40 at Step 506. For example, once the warranty data structure 90 of the supplier 80 has been accessed at Step 502, and the external data access module 167 and/or the external data processing module 168 has performed a remote lookup of the specific product in the warranty data structure 90 of the supplier 80 at Step 504, the second processing unit 64 may be configured to receive a warranty coverage indication 128 from the warranty data structure 90 of the supplier 80 at Step 506.

In one embodiment, the external data access module 167 and/or the external data processing module 168 of the control system 60 may compare the specific product information obtained from the universal data structure 70 to product data 91 in the warranty data structure 90 in order to determine corresponding customer data 92 on the entity seeking warranty verification and/or warranty data 93 related to said product. In one example, the warranty data 93 may relate to warranty eligibility time, such as time remaining in a warranty period and/or options for addressing problems covered under a warranty for the specific product. In another embodiment, the external data processing module 168 may be configured to process and/or analyze information received from the warranty data structure 90 of the supplier 80 in order to determine the extent to which the specific product for which warranty verification is sought might be covered.

Some embodiments of the present disclosure may involve transmitting to the entity an indication of warranty coverage. As used herein, the term indication of warranty coverage may relate to any warranty eligibility information which may be provided to an entity seeking warranty verification of a specific product. The indication of warranty coverage may indicate the extent to which the specific product for which warranty verification is sought is covered, for example an instruction on how to achieve a warranty-related remedy. Alternatively, the indication of warranty coverage may indicate that the specific product for which warranty verification is sought is not covered under the warranty for the specific product. An indication that a product sought is not covered under warranty may include information on how to fix the product or may offer an alternative product to purchase.

The indication of warranty coverage may be transmitted from the warranty control center to the entity's mobile communications device (or to any computing device associated with the entity) based on information received from the supplier of the specific product. In a general sense, the indication of warranty coverage transmitted to an entity seeking warranty verification may be similar to aspects of the previously discussed warranty coverage indication received from the supplier. Moreover, transmitting an indication of warranty coverage to the entity seeking warranty verification may occur in a manner similar to transmitting the instruction to an entity to capture at least one product image of a specific product or an image of a purchase receipt for the specific product, as previously discussed.

Figure 16:
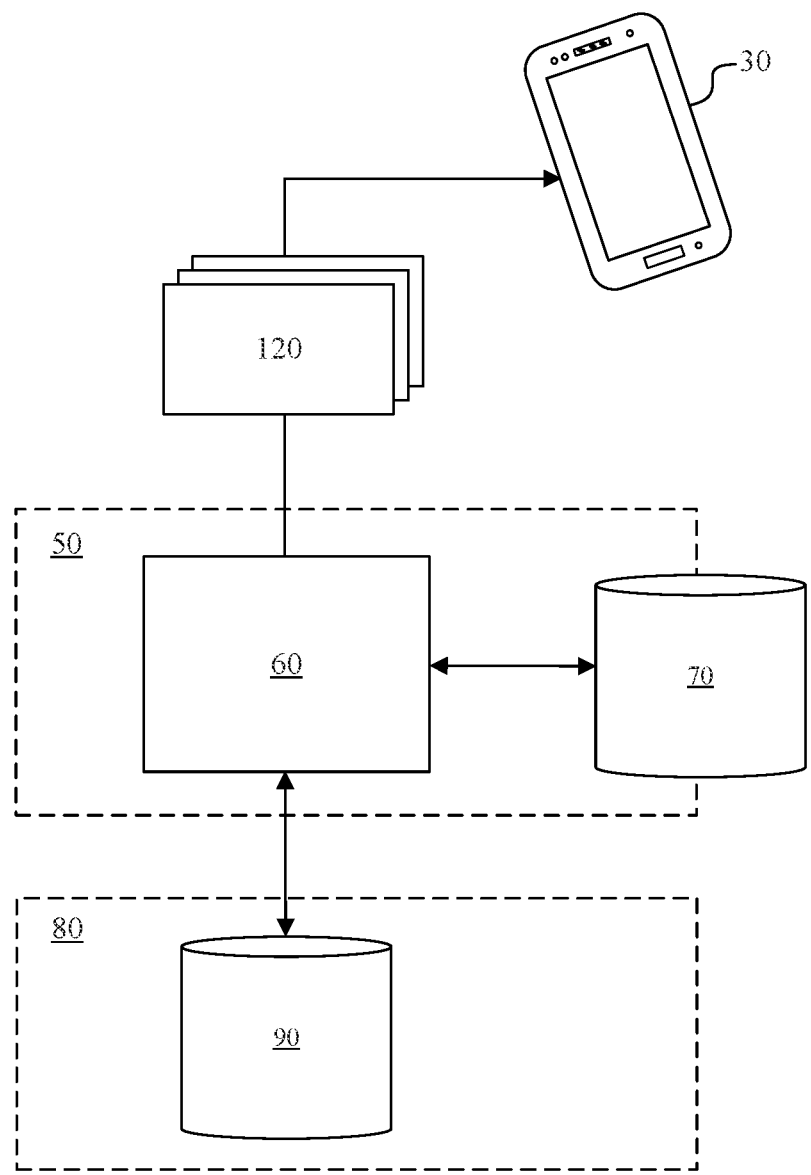
FIG. 16 is a functional block diagram schematically illustrating certain aspects of a remote artificial intelligence-assisted electronic warranty verification session, consistent with at least one embodiment of the present disclosure.
Figure 17:
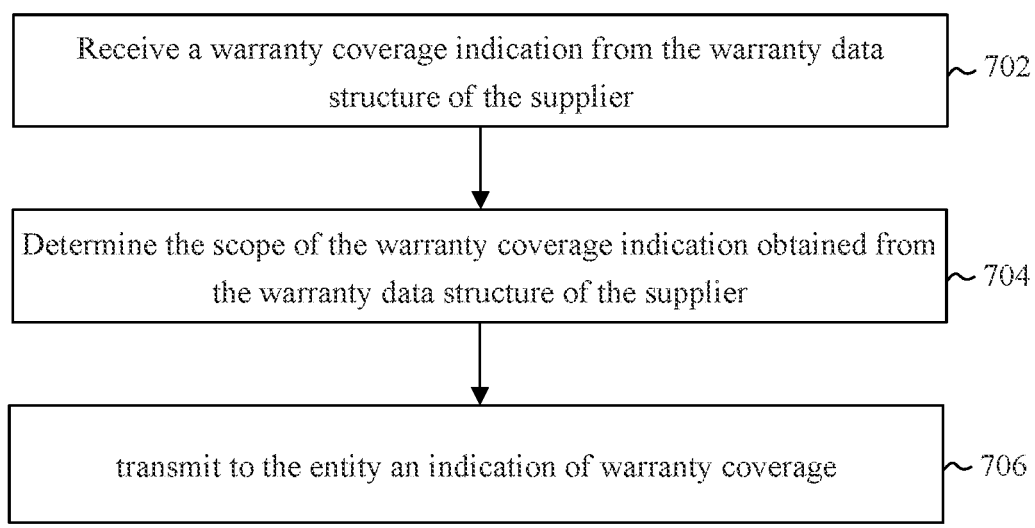
FIG. 17 is a flow chart illustrating exemplary operations of the remote artificial intelligence-assisted electronic warranty verification session related to warranty coverage, consistent with at least one embodiment of the present disclosure.
Figure 18A:
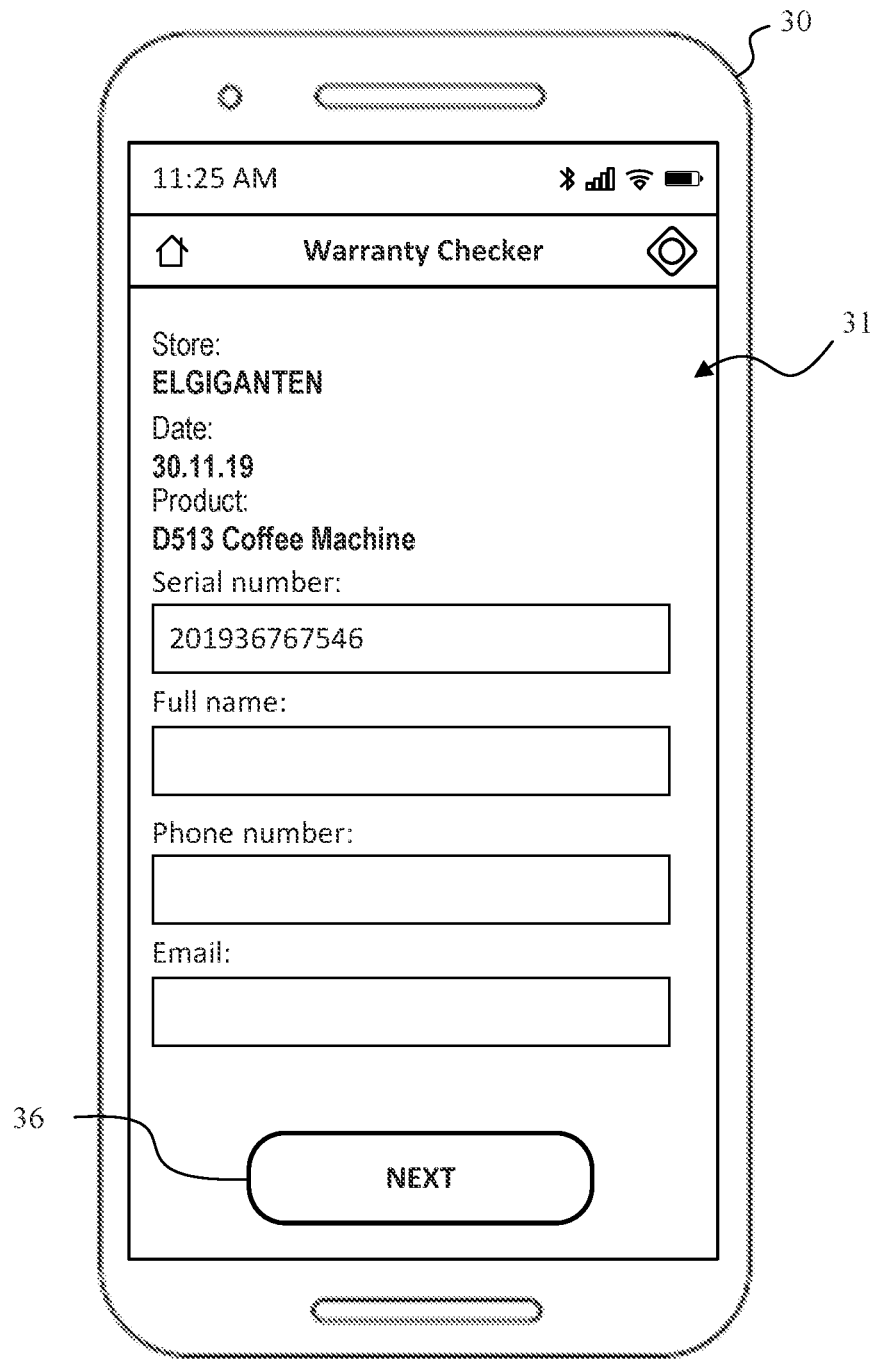
FIGS. 18A-18D illustrate exemplary interactive applications relating to the remote artificial intelligence-assisted electronic warranty verification session displayed on an entity's mobile communications device, consistent with at least one embodiment of the present disclosure.
Figure 18B:
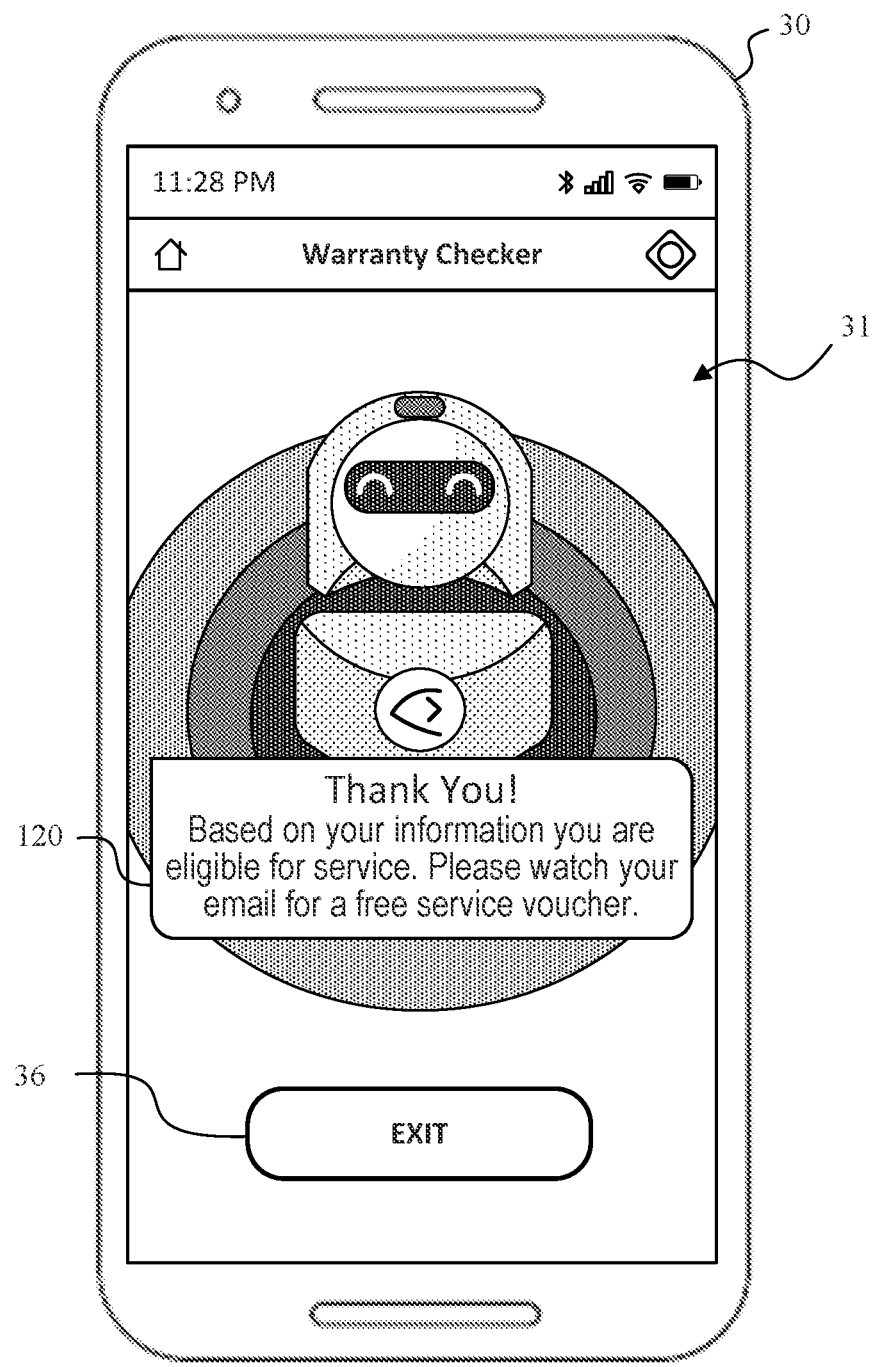
Figure 18C:
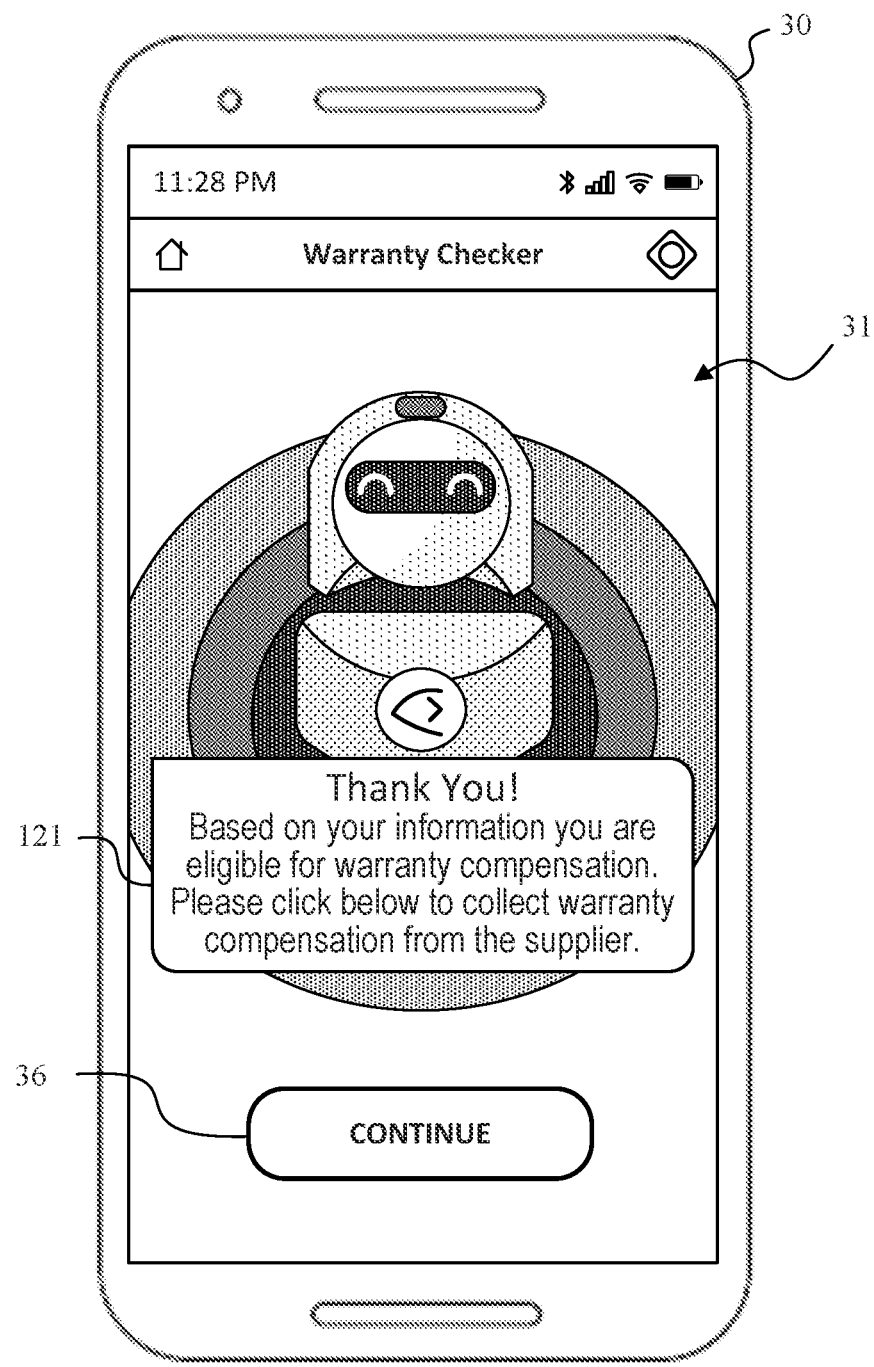
Figure 18D:
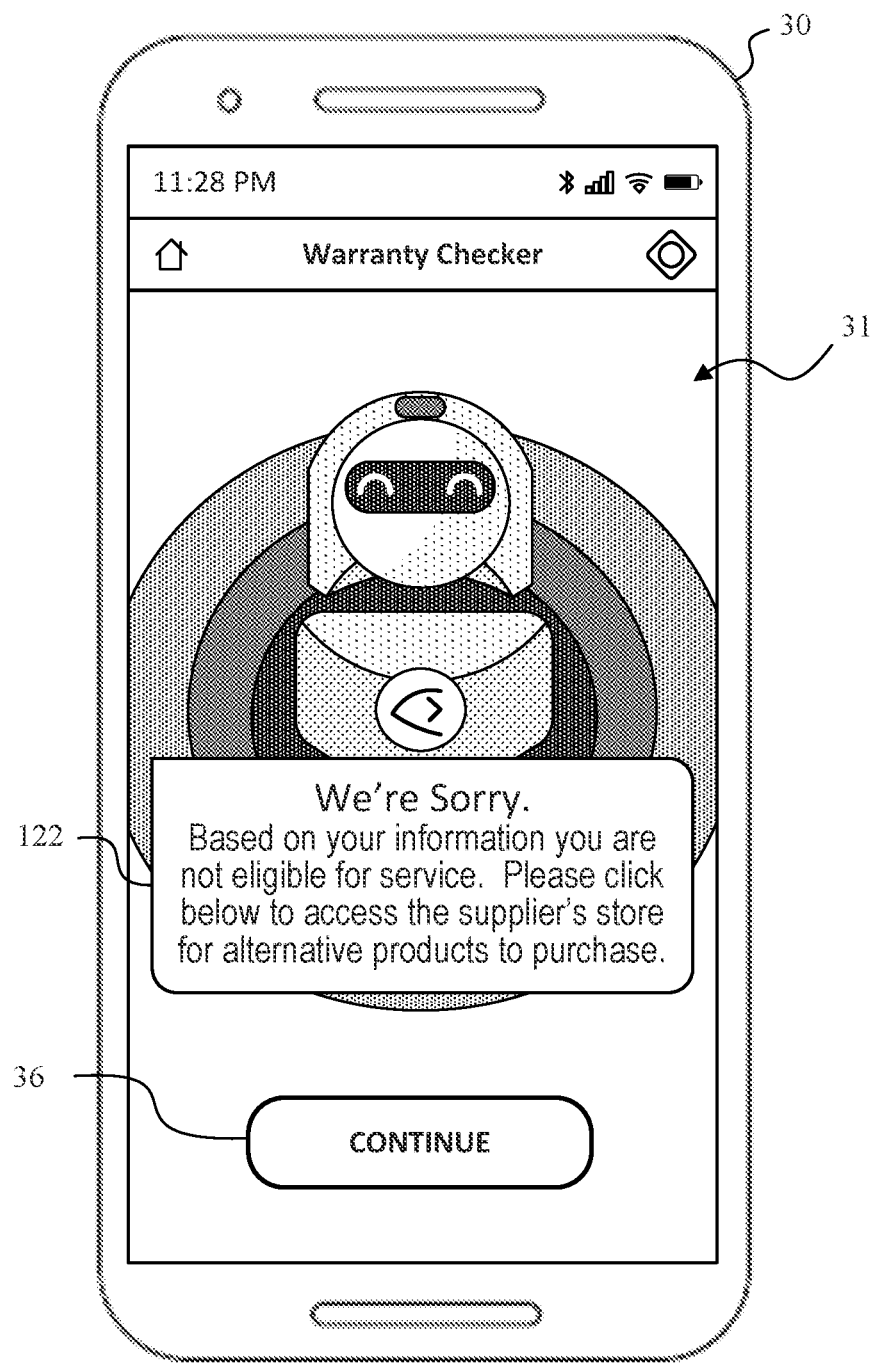

FIG. 16 illustrates a functional block diagram in which the control system 60 of WSC 50 is configured to transmit an indication of warranty coverage 120 with respect to a product for which warranty verification is sought to the entity's mobile communications device 30 during certain operations of the remote artificial intelligence-assisted electronic warranty verification session. FIG. 17 is a flow chart illustrating exemplary operations of the remote artificial intelligence-assisted electronic warranty verification session related to warranty coverage, as depicted in FIG. 16. FIGS. 18A-18D illustrate exemplary interactive applications relating to the remote artificial intelligence-assisted electronic warranty verification session displayed on an entity's mobile communications device, consistent with at least one embodiment of the present disclosure.

The control system of the WSC 50 illustrated in FIG. 16 may be configured to transmit an indication of warranty coverage 120 with respect to a product for which warranty verification is sought to the entity's mobile communications device 30 via at least one network during certain operations of the remote artificial intelligence-assisted electronic warranty verification session. For example, the WSC 50 may be configured to receive a warranty coverage indication from the warranty data structure 90 of the supplier 80 at Step 702 of FIG. 17, determine the scope of the warranty coverage indication obtained from the warranty data structure 90 of the supplier 80 at Step 704, and transmit to the entity 20 an indication of warranty coverage 120 at Step 706.

In one embodiment, the indication of warranty coverage 120 may be presented via an interactive application on a mobile communications device 30, as depicted in FIGS. 18A-18D. The interactive application may enable the entity 20 to obtain an indication of warranty coverage. Optionally, the interactive application may enable the entity 20 to take the appropriate next steps in addressing the issue for which warranty verification was sought. In the example illustrated in FIG. 18A, the interactive application visually displayed on the display unit 31 of the mobile communications device 30 may depict the results of the previously conducted image analysis. The results of the image analysis may list the specific product for which warranty verification is sought, the purchase date, and product identifying information. The results of the image analysis may also include additional fields which may enable the entity 20 to input further information which may be required by the WSC 50 and/or the supplier 80 to proceed with the warranty verification process.

In one embodiment, the indication of warranty coverage 120 may include a conclusion of coverage under the warranty which may indicate the extent to which the specific product for which warranty verification is sought may be covered under the warranty. In the example illustrated in FIG. 18B, the interactive application visually displayed on the display unit 31 of the entity's mobile communications device 30 contains an indication of warranty coverage 120. In this example, the indication of warranty coverage 120 indicates that the product for which support is sought is covered under the warranty (e.g., Thank You! Based on your information you are eligible for service.").

In another embodiment of the present disclosure, the indication of warranty coverage may include an instruction on how to achieve a warranty-related remedy. As disclosed herein, the instruction on how to achieve a warranty-related remedy may include instructions on how to return the product, where to return the product, how to obtain replacement parts, how to receive repair services, and/or additional required submissions to receive compensation, replacement parts, or repair services. In the example illustrated in FIG. 18B, the interactive application visually displayed on the display unit 31 of the mobile communications device 30 contains an indication of warranty coverage 120 which includes a conclusion of coverage under the warranty as well as an instruction directing the entity to watch their email for next steps ("Please watch your email for a free service voucher.").

In another embodiment of the present disclosure, the warranty coverage indication may include an authorization to collect warranty compensation from the supplier. As disclosed herein, an authorization to collect warranty compensation from the supplier may relate to permission given by the supplier to the warranty service center to allow the entity to repair, exchange, or otherwise be reimbursed for a product that does not function as originally described or intended. In the example illustrated in FIG. 18C, the interactive application visually displayed on the display unit 31 of the mobile communications device 30 contains an indication of warranty coverage 121 which includes a conclusion of coverage under the warranty as well as an instruction to click the widget 36 to collect compensation from the supplier (e.g., "Please click below to collect warranty compensation from the supplier.)." Thus, the entity 20 may receive, from the WSC 50, authorization to collect warranty compensation from the supplier 80.

In another embodiment of the present disclosure, the warranty coverage indication may include a conclusion of non-coverage. The conclusion of non-coverage may indicate that the specific product for which warranty verification is sought is not covered under the warranty for the specific product. An indication that a product sought is not covered under warranty may include information on how to fix the product or may offer an alternative product to purchase. In the example illustrated in FIG. 18D, the interactive application visually displayed on the display unit 31 of the mobile communications device 30 contains an indication of warranty non-coverage 122 indicating that the product for which support is sought is not covered under the warranty as well as an instruction to click the widget 36 to collect compensation from the supplier (e.g., "Please click below to access the supplier's store for alternative products to purchase.)."

Accordingly, the systems, methods, and non-transitory computer readable medium disclosed herein may relate to artificial intelligence-assisted electronic warranty verification operations in which the warranty service center may remotely perform product warranty verification in an automated fashion using artificial intelligence. The operations may relate to a plurality of simultaneous artificial intelligence-assisted electronic warranty verification sessions with a plurality of entities. The techniques and/or operations disclosed herein may establish a self-service mechanism in which human support from the warranty verification center is not required. For example, an interactive self-service application accessible via the entity's mobile communications device may be utilized to during the warranty verification session. The remote artificial intelligence-assisted electronic warranty verification operations may be useful for increasing the accuracy of warranty identification outcomes, increasing the accuracy warranty eligibility verification, reducing the frequency of incorrect warranty coverage indications, limiting the incidence of communication with customer support assistant, shortening consumer wait time, and improving customer satisfaction and independence.

As used throughout this disclosure, the terms "processor," "computer," "control system," "controller," "control unit," "processing unit," "computing unit," and/or "processing module" should be expansively construed to cover any kind of electronic device, component, or unit with data processing capabilities, including, by way of a non-limiting example, a personal computer, a wearable computer, a tablet, a smartphone, a server, a computing system, a cloud computing platform, a communication device, a processor, possibly with embedded memory, a single core processor, a multi core processor, a core within a processor, any other electronic computing device, or any combination of the above. The operations, in accordance with the teachings disclosed herein, may be performed by a control system specially constructed or programmed to perform the described functions.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "unit," "circuit," "module" or "system." Furthermore, aspects of the present disclosure may take the form of a computer program product embodied in one or more computer readable medium(s) having computer readable program code embodied thereon.

As described hereinabove and shown in the associated figures, the present disclosure provides warranty verification techniques, systems, and methods, for expeditiously verifying a products warranty during an automated self-service session using artificial intelligence to analyze a product image and/or a purchase receipt. While particular embodiments of the disclosure have been described, it will be understood, however, that the disclosure is not limited thereto, since modifications may be made by those skilled in the art, particularly in light of the foregoing teachings. As will be appreciated by the skilled person, the disclosure can be carried out in a great variety of ways, employing more than one technique from those described above, all without exceeding the scope of the claims.

The foregoing description has been presented for purposes of illustration. It is not exhaustive and is not limited to the precise forms or embodiments disclosed herein. Modifications and adaptations will be apparent to those skilled in the art from consideration of the specification and practice of the disclosed embodiments. Although certain aspects of the disclosed embodiments are described as being stored in memory or data structure, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or any other optical drive media.

Computer programs based on the written description and disclosed methods are within the skills of an experienced developer. The various programs or program modules may be created using any of the techniques known to one skilled in the art or may be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. Additionally, it is to be understood that the technology disclosed herein may be implemented by software which may be integrated into existing computer readable mediums and/or systems of warranty support centers and/or organizations and which may replace said software or work in parallel thereto.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. A system for performing a remote artificial intelligence-assisted electronic warranty verification, the system comprising:
at least one processor configured to:
transmit an instruction to an entity to capture at least one product image of a specific product;
receive the at least one product image;
perform a product image analysis on the at least one product image to identify at least one product-distinguishing characteristic;
transmit an instruction to the entity to capture an image of a purchase receipt for the specific product;
receive the purchase receipt image;
perform a receipt image analysis on the received purchase receipt image to identify product purchase information including a purchased product identity and a purchase date;
access a universal data structure containing data on products offered by a plurality of suppliers;
use the at least one product-distinguishing characteristic obtained from the product image analysis on the at least one product image and the product purchase information obtained from the receipt image analysis on the received purchase receipt image to identify in the universal data structure the specific product;
identify in the universal data structure a supplier of the specific product;
identify in the universal data structure a link to a warranty data structure of the supplier;
access the link to perform a remote lookup of the specific product in the warranty data structure of the supplier;
receive a warranty coverage indication from the warranty data structure of the supplier; and
transmit to the entity an indication of warranty coverage.

2. The system of claim 1, wherein the product image analysis includes using artificial intelligence to distinguish the specific product from other products having similar appearances.

3. The system of claim 1, wherein the product image analysis includes performing an optical character recognition on the at least one product image.

4. The system of claim 1, wherein the instruction to the entity to capture the at least one product image of the specific product includes a direction to capture an image of a manufacturer's product sticker and wherein the product image analysis includes employing artificial intelligence to interpret the manufacturer's product sticker.

5. The system of claim 1, wherein the receipt image analysis includes employing artificial intelligence to identify the purchased product identity, the purchase date, and an identity of an establishment from which the product was purchased.

6. The system of claim 1, wherein the image of the purchase receipt identifies a plurality of purchased products and wherein the at least one processor is configured to apply artificial intelligence to information from the universal data structure in order to match one of the plurality of purchased products on the purchase receipt with the product-distinguishing characteristic determined from the at least one product image in order to determine the corresponding specific product.

7. The system of claim 1, wherein the at least one processor is further configured to determine that the image of the purchase receipt identifies a plurality of purchased products and to transmit a request to the entity to identify a specific one of the plurality of purchased products.

8. The system of claim 7, wherein the request to identify the specific one of the plurality of purchased products includes a request to capture the image of the purchase receipt with an indication in the image of the purchase receipt identifying the specific one of the plurality of purchased products.

9. The system of claim 1, wherein the indication of warranty coverage includes an instruction on how to achieve a warranty-related remedy.

10. The system of claim 1, wherein the universal data structure includes an authorization code for accessing the warranty data structure of the supplier, and wherein accessing the link includes transmitting the authorization code to the supplier.

11. The system of claim 1, wherein the warranty coverage indication includes an authorization to collect warranty compensation from the supplier.

12. The system of claim 1, wherein the warranty coverage indication includes a conclusion of non-coverage.

13. The system of claim 1, wherein the supplier is at least one of a manufacturer or a manufacturer's agent.

14. A non-transitory computer readable medium containing instructions for performing remote artificial intelligence-assisted electronic warranty verification operations, the operations comprising:
transmitting an instruction to an entity to capture at least one product image of a specific product;
receiving the at least one product image;
performing a product image analysis on the at least one product image to identify at least one product-distinguishing characteristic;
transmitting an instruction to the entity to capture an image of a purchase receipt for the specific product;
receiving the purchase receipt image;
performing a receipt image analysis on the received purchase receipt image to identify product purchase information including a purchased product identity and a purchase date;
accessing a universal data structure containing data on products offered by a plurality of suppliers;
using the at least one product-distinguishing characteristic obtained from the product image analysis on the at least one product image and the product purchase information obtained from the receipt image analysis on the received purchase receipt image to identify in the universal data structure the specific product;
identifying in the universal data structure a supplier of the specific product;
identifying in the universal data structure a link to a warranty data structure of the supplier;
accessing the link to perform a remote lookup of the specific product in the warranty data structure of the supplier;
receiving a warranty coverage indication from the warranty data structure of the supplier; and transmitting to the entity an indication of warranty coverage.

15. The non-transitory computer readable medium of claim 14, wherein the operations further include:
   determining that the purchase receipt identifies a plurality of purchased products and applying artificial intelligence to information from the universal data structure in order to match one of the plurality of purchased products on the purchase receipt with the product-distinguishing characteristic determined from the at least one product image in order to determine the corresponding specific product.

16. The non-transitory computer readable medium of claim 14, wherein the universal data structure includes an authorization code for accessing the warranty data structure of the supplier, and wherein accessing the link includes transmitting the authorization code to the supplier.

17. The non-transitory computer readable medium of claim 14, wherein the operations further include:
   determining that the image of the purchase receipt identifies a plurality of purchased products and transmitting a request to the entity to identify a specific one of the plurality of purchased products.

18. A method for performing remote artificial intelligence-assisted electronic warranty verification operations, the method comprising:
   transmitting an instruction to an entity to capture at least one product image of a specific product;
   receiving the at least one product image;
   performing a product image analysis on the at least one product image to identify at least one product-distinguishing characteristic;
   transmitting an instruction to the entity to capture an image of a purchase receipt for the specific product;
   receiving the purchase receipt image;
   performing a receipt image analysis on the received purchase receipt image to identify product purchase information including a purchased product identity and a purchase date;
   accessing a universal data structure containing data on products offered by a plurality of suppliers;
   using the at least one product-distinguishing characteristic obtained from the product image analysis on the at least one product image and the product purchase information obtained from the receipt image analysis on the received purchase receipt image to identify in the universal data structure the specific product;
   identifying in the universal data structure a supplier of the specific product;
   identifying in the universal data structure a link to a warranty data structure of the supplier;
   accessing the link to perform a remote lookup of the specific product in the warranty data structure of the supplier;
   receiving a warranty coverage indication from the warranty data structure of the supplier; and
   transmitting to the entity an indication of warranty coverage.

19. The method of claim 18, wherein the method further comprises:
   determining that the purchase receipt identifies a plurality of purchased products and applying artificial intelligence to information from the universal data structure in order to match one of the plurality of purchased products on the purchase receipt with the product-distinguishing characteristic determined from the at least one product image in order to determine the corresponding specific product.

20. The method of claim 18, wherein the method further comprises:
   determining that the image of the purchase receipt identifies a plurality of purchased products and transmitting a request to the entity to identify a specific one of the plurality of purchased products.

* * * * *